(12) United States Patent
Fraccaroli

(10) Patent No.: US 9,704,132 B2
(45) Date of Patent: Jul. 11, 2017

(54) METHOD, SYSTEM AND APPARATUS FOR ADAPTING THE FUNCTIONALITIES OF A CONNECTED OBJECT ASSOCIATED WITH A USER ID

(71) Applicant: Federico Fraccaroli, Irving, TX (US)

(72) Inventor: Federico Fraccaroli, Irving, TX (US)

( * ) Notice: Subject to any disclaimer, the term of this patent is extended or adjusted under 35 U.S.C. 154(b) by 316 days.

(21) Appl. No.: 14/153,032

(22) Filed: Jan. 11, 2014

(65) Prior Publication Data

US 2015/0199547 A1    Jul. 16, 2015

(51) Int. Cl.
| | |
|---|---|
| H04Q 5/22 | (2006.01) |
| G06Q 10/10 | (2012.01) |
| G06Q 10/00 | (2012.01) |
| F41A 17/06 | (2006.01) |
| B60R 16/037 | (2006.01) |
| G07C 9/00 | (2006.01) |

(52) U.S. Cl.
CPC .......... *G06Q 10/10* (2013.01); *B60R 16/037* (2013.01); *F41A 17/063* (2013.01); *G06Q 10/00* (2013.01); *G07C 9/00571* (2013.01); *G07C 2009/00793* (2013.01); *G07C 2209/04* (2013.01)

(58) Field of Classification Search
None
See application file for complete search history.

(56) References Cited

U.S. PATENT DOCUMENTS

| | | | | |
|---|---|---|---|---|
| 8,396,452 B1* | 3/2013 | Matsuoka | ............... | G06F 21/35 455/410 |
| 8,688,306 B1* | 4/2014 | Nemec | ................. | G05D 1/0214 104/250 |
| 2007/0096909 A1* | 5/2007 | Lally | .................... | G06K 7/0008 340/572.1 |
| 2009/0182460 A1* | 7/2009 | O'Neal | .................. | G08C 17/00 701/2 |
| 2009/0206992 A1* | 8/2009 | Giobbi | ................. | G06F 19/322 340/5.74 |
| 2009/0298514 A1* | 12/2009 | Ullah | ....................... | G01S 5/02 455/456.5 |
| 2013/0318847 A1* | 12/2013 | Kelly | ...................... | F41A 17/46 42/70.06 |
| 2014/0099899 A1* | 4/2014 | Jamal-Syed | ........ | H04L 63/0492 455/41.2 |
| 2014/0113589 A1* | 4/2014 | Kurupacheril | ........ | H04W 12/06 455/411 |
| 2014/0165094 A1* | 6/2014 | Hardy | ............. | H04N 21/25841 725/34 |

(Continued)

*Primary Examiner* — Brian Zimmerman
*Assistant Examiner* — Kevin Lau
(74) *Attorney, Agent, or Firm* — Federico Fraccaroli

(57) ABSTRACT

In accordance with one example embodiment of the present invention a method is provided for adapting and customizing the attributes and the functionalities of a connected object according to preferences, settings and permissions associated with a user paired with said connected object. In some implementations, at least part of the inputs and adjustments imparted by said user to said connected object via an input/output user interface could seamlessly translate into other connected objects that belong to the same class and are paired with said user. In other implementations, the pairing of connected target objects with user IDs provides novel functionalities.

20 Claims, 7 Drawing Sheets

(56) References Cited

U.S. PATENT DOCUMENTS

| | | | | |
|---|---|---|---|---|
| 2014/0184496 A1* | 7/2014 | Gribetz | ............... | G02B 27/017 345/156 |
| 2014/0214547 A1* | 7/2014 | Signorelli | .......... | G06Q 30/0267 705/14.64 |
| 2014/0297001 A1* | 10/2014 | Silverman | .............. | G05B 15/02 700/19 |
| 2014/0380505 A1* | 12/2014 | Camacho | ................. | G06F 21/31 726/28 |
| 2015/0048926 A1* | 2/2015 | Vincent | ............... | G07C 9/00111 340/5.61 |
| 2015/0067805 A1* | 3/2015 | Martin | ................. | H04W 12/06 726/7 |

\* cited by examiner

User Datagram ID-A 600

| Configurable Target Objects Classes 610 | Sub Classes 620 | Sub-Sub Classes 630 | Personalizations 640 | Settings 650 | Permissions 660 |
|---|---|---|---|---|---|
| Wireless Handheld Devices 611 | Wireless Personal Mobile Devices 621 | •Brand<br>•Hardware<br>•...... | •Import and use user's personal number<br>•Import folders containing links to files stored on cloud<br>•Import bookmarks — 642 | •Attempt to connect to open Wi-Fi first 652 | •List of Users ID allowed<br>•Use credit card X up to 10$ credit<br>•Functional until DATE 665 |
|  | Smart-phones 622 | •Carrier<br>•Brand 631<br>•Hardware<br>•...... | •Import folders containing links to files stored on cloud<br>•Import bookmarks 641 | •Attempt to connect to subscribed carrier Wi-Fi first 651 | •Functional until DATE<br>•List of Users ID allowed 661<br>•Functional only in Texas |
| Vehicles 612 | Personal Car 623 | •Brand<br>•Hardware<br>•...... | •Driver seat position<br>•Temperature<br>•Radio Stations<br>•Import Favorite Locations on GPS 643 | •Optimize consumption<br>•Optimize safety 653 | •Functional only within geofence centered on Lat Long, radius 500 miles<br>•List of Users ID allowed<br>•Only safe drive allowed if driver older than 65. |
|  | Rented Car 624 | •Brand<br>•Hardware | •Import Favorite Locations on GPS<br>•Driver seat position 644 | •Optimize consumption<br>•Speed Limiter = 65 Mph<br>•Optimize safety 654 | •Charge to Company account up to X amount<br>•List of Users ID allowed<br>•If Drive older than 70 then only safe mode driving. |
| Smart Weapons 613 | Law Enforcement 625 | •Brand<br>•Hardware | •Adjust Telescope to user's settings | •Alert Police if a Shot is fired (send position) 655 | •Functional only in Texas<br>•Not functional if not in proximity of police car X. 662<br>•List of Users ID allowed |
|  | Private Citizens 626 | •Brand<br>•Hardware | •Adjust Telescope to user's settings 645 | •Max 5 shots rounds | •Alert Police if Shot is fired (send position) 663<br>•Functional within 500 yards from homestead.<br>•List of Users ID allowed |
| Wearable Devices 614 | Augmented Reality Glasses 627 | •Brand<br>•Hardware<br>•...... | •Augment Music Events Around User<br>•Augment User's Contacts Around User' Position when within one mile distance 646 | •Do not augment if a movement vector in excess of 30MpH is detected. 656 | •Augmented reality game active until DATE.<br>•Tourist package for city active until DATE. 664<br>•List of Users ID allowed |
| ............ | ............ | ............ |  |  | ............ |

FIGURE 6

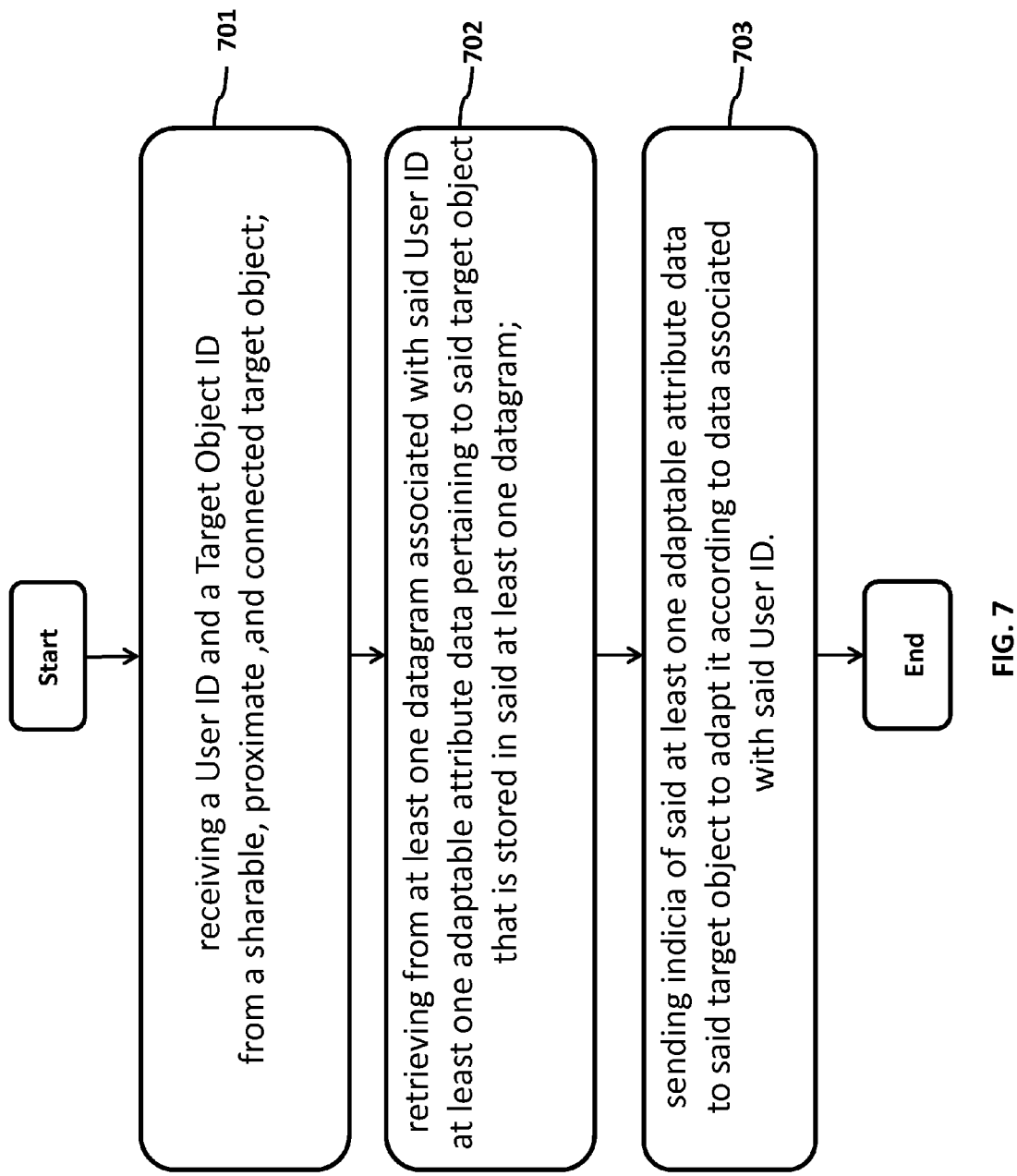

METHOD, SYSTEM AND APPARATUS FOR ADAPTING THE FUNCTIONALITIES OF A CONNECTED OBJECT ASSOCIATED WITH A USER ID

TECHNICAL FIELD

The present application generally relates to a method, a system and an apparatus for customizing, defining permissions, defining settings, and interacting with connected and proximate objects. The definition of the technical field is not intended to be limiting of the scope of the present application or continuation applications.

BACKGROUND

Radio-frequency identification (RF-ID) is, generally, the wireless use of radio frequency to transfer data, for automatically identifying and tracking tags attached to objects.

The tags may contain electronically stored information. Passive tags collect energy from the interrogating electromagnetic field and then act as a passive transponder to emit radio waves. Battery powered tags, on the other hand, may operate at a distance of hundreds of meters.

A tag usually comprises a microchip attached to an antenna that is packaged in a way that it can be applied to an object. A tag picks up signals from and sends signals to a reader. It may contain a unique serial number, but may also have other information, such as a customers' account number. Tags may come in many forms, such smart labels that can have a barcode printed on it, or the tag can simply be embedded in plastic.

RF-ID tags can be active, semi-passive and passive. Passive tags are less expensive to produce, and they can be made small enough to fit on almost any product. Active and semi-passive RF-ID tags use internal batteries to power their circuits. An active tag uses its battery to broadcast radio waves to a reader, whereas a semi-passive tag generally relies on the reader to supply its power for broadcasting. Because these tags contain more hardware than passive RF-ID tags, they are currently more expensive than a pure passive tag.

Currently, active and semi-passive tags are used for more costly items that are read over greater distances. They broadcast high frequencies from 850 to 950 MHz that can be read 100 feet or more away. If it is necessary to read the tags from farther away, additional batteries can boost a tag's range to more than 300 feet. Like other wireless devices, RF-ID tags broadcast over a portion of the electromagnetic spectrum. The exact frequency is variable and can be chosen to avoid interference with other electronics or among RF-ID tags and readers in the form of tag interference or reader interference. In some implementations, RF-ID systems can use a cellular system called Time Division Multiple Access (TDMA) to make sure the wireless communication is handled properly and reduce packets collisions.

Passive RF-ID tags rely entirely on the reader as their power source. These tags are read up to 20 feet away, and they have lower production costs. Usually, these tags are manufactured to be disposable, along with the disposable consumer goods on which they are placed.

As technology advances, different methods have been described to interact with proximate objects using RF-ID technologies. Some disclosures pertain to location-based functionalities such as, e.g., U.S. Pat. No. 8,150,439 titled "Facilitating user interactions based on proximity". Some other disclosure pertain to methods for controlling a target device using another device such as, e.g., in U.S. Pat. No. 8,504,008 titled "Virtual control panels using short-range communication." Some other disclosures illustrate an identification and verification system that makes it possible for a user to easily open locks and/or gain entry to secured systems such as, e.g., in U.S. Pat. No. 8,430,310, titled "Wireless directional identification and verification using wearable electronic devices."

In another disclosure, such as in patent application US 2012/0178431 A1 filed on Jan. 9, 2012 and entitled "Proximity-Enabled Remote Control", an invention is described that relates to a system that enables a mobile device to be approximated with an object in order to enable control of said object. In one possible embodiment of US 2012/0178431 A1, a mobile device is brought in physical proximity with an object, the identity of the object is determined wirelessly and, based on such determination, a remote control user interface is presented by the mobile device, wherein said mobile device receives input relating to a desired control action for the object.

In other disclosure such as U.S. Pat. No. 8,127,482 titled "Safety System for Firearms", a safety system for firearm based on RF-ID technology is described. Said invention is based on an electronic enabling/disabling mechanism that relies on an RF-ID reader embedded in the weapon coupled with an RF-ID tag that allows the unlocking of the safety mechanism under certain conditions.

The person skilled in the art will understand that security and privacy are elements of significance, especially for critical applications involving, for example, weapons, money transaction, paid subscriptions or privacy. With regard to RF-ID technologies EPC Gen2v2 is a new version of the ultrahigh frequency (UHF) EPC Gen 2 standard. EPC Gen2v2 that provides a series of features intended to improve security and deter the counterfeiting of tagged products, by enabling the authentication of a tag or a reader, and includes privacy features for consumers, as well as a way for embedded tags to identify themselves as such to an interrogator. The EPC™ Radio-Frequency Identity Protocols Generation-2 UHF RF-ID (EPC Gen2v2) is available at www.gs1.org.

Gen2v2 enhances security and privacy of RF-ID products by comprising features such as: 1) Untraceable function to hide portions of data, restrict access privileges, and reduce a tag's read range; 2) Support for cryptographic authentication of tags and readers, to verify identity and provenance, as well as reduce the risk of counterfeiting and unauthorized access; 3) Enhanced User Memory for supplementary encodings such as maintenance logging during a product's life cycle; 4) "Non-removable" flag for embedded tagging of electronics and sewn-in tagging of apparel, to indicate that a tag cannot be removed without compromising the tagged product's intended functionality; 5) Hard-coded extended Tag Identifier (XTID) to assist product authenticity and anti-counterfeiting efforts.

The person skilled in the art will understand that some of the implementations described in this application may call for the realization of at least some of the security and privacy features described in the present or future versions of the EPC™ Radio-Frequency Identity Protocols Generation-2 UHF RF-ID (EPC Gen2v2) or other standards that may develop in the future addressing privacy and security.

The person skilled in the art will also appreciate that the contemporaneous presence of more than one tag or more than one RF-ID interrogator in the same location may generate interference issues. The literature discussing this problem is also very extensive. For example, Sayeed M I, Kim Y S, Yang H and Yook J G have suggested a beamforming approach in their "A Solution to the RF-ID Reader Interference Problem using Adaptive Beam-forming Approach", published in "IETE Tech Rev 2011" at pages 17-28.

Other solutions are based on software such as the one proposed by Syed S. Rizvi, Eslam M. Gebriel and Aasia Riasat in their "RF-ID: A New Software Based Solution to Avoid Interference" published in "Advances in Computer and Information Sciences and Engineering" 2008 at pages 521-525.

All the patents, patent applications, standards and published documents mentioned in this patent application are incorporated herein by reference in their entirety. Furthermore, where a definition or use of a term in a document that is incorporated by reference is inconsistent or contrary to the definition of that term provided herein, the definition of that term provided herein applies and the definition of that term in the reference does not apply.

SUMMARY

Various aspects and examples of the invention are set out in the claims. According to a first aspect of the present invention, a method comprises at least receiving a User ID and a Target Object-ID from a connected target object; retrieving from at least one datagram associated with said User ID at least one adaptable attribute data pertaining to said target object that is stored in said at least one datagram; and sending indicia of said at least one adaptable attribute data to said target object to adapt it according to data associated with said User ID.

According to a second aspect of the present invention, an apparatus comprises at least one processor; and at least one non-transitory computer-readable medium including a computer program code; the at least one non-transitory computer-readable medium and the computer program code configured to, with the at least one processor, cause the apparatus to perform at least the following: receiving a User ID and a Target Object-ID from a connected target object; retrieving from at least one datagram associated with said User ID at least one adaptable attribute data pertaining to said target object that is stored in said at least one datagram; and sending indicia of said at least one adaptable attribute data to said target object to adapt it according to data associated with said User ID.

According to a third aspect of the present invention, a computer software system has a set of instructions for controlling at least one general-purpose digital computer in performing desired functions comprising a set of instructions formed into each of a plurality of modules, each modules comprising: a process for receiving a User ID and a Target Object-ID from a connected target object; a process for receiving a User ID and a Target Object-ID from a connected target object; a process for retrieving from at least one datagram associated with said User ID at least one adaptable attribute data pertaining to said target object that is stored in said at least one datagram; and a process for sending indicia of said at least one adaptable attribute data to said target object to adapt it according to data associated with said User ID.

According to an embodiment of the present invention a new generation of connected and shared target objects is defined whose proximity with a user and the pairing with said user will result in the adapting of said objects to the personalization, settings and permissions that are peculiar to the combination of said target object and said user.

BRIEF DESCRIPTION OF THE DRAWINGS

For a more complete understanding of example embodiments of the present invention, reference is now made to the following descriptions taken in connection with the accompanying drawings in which:

FIG. 6 represents a schematic and exemplary representation of a User Datagram ID-A 600; other possible datagrams may not incorporate a classification system but could be ad-hoc and or specific for standardized target objects;

FIG. 7 represents an exemplary method embodiment of the invention.

DETAILED DESCRIPTION OF THE DRAWINGS

An example embodiment of the present invention and its potential advantages are understood by referring to FIGS. 1 through 7 of the drawings.

Figure 1:
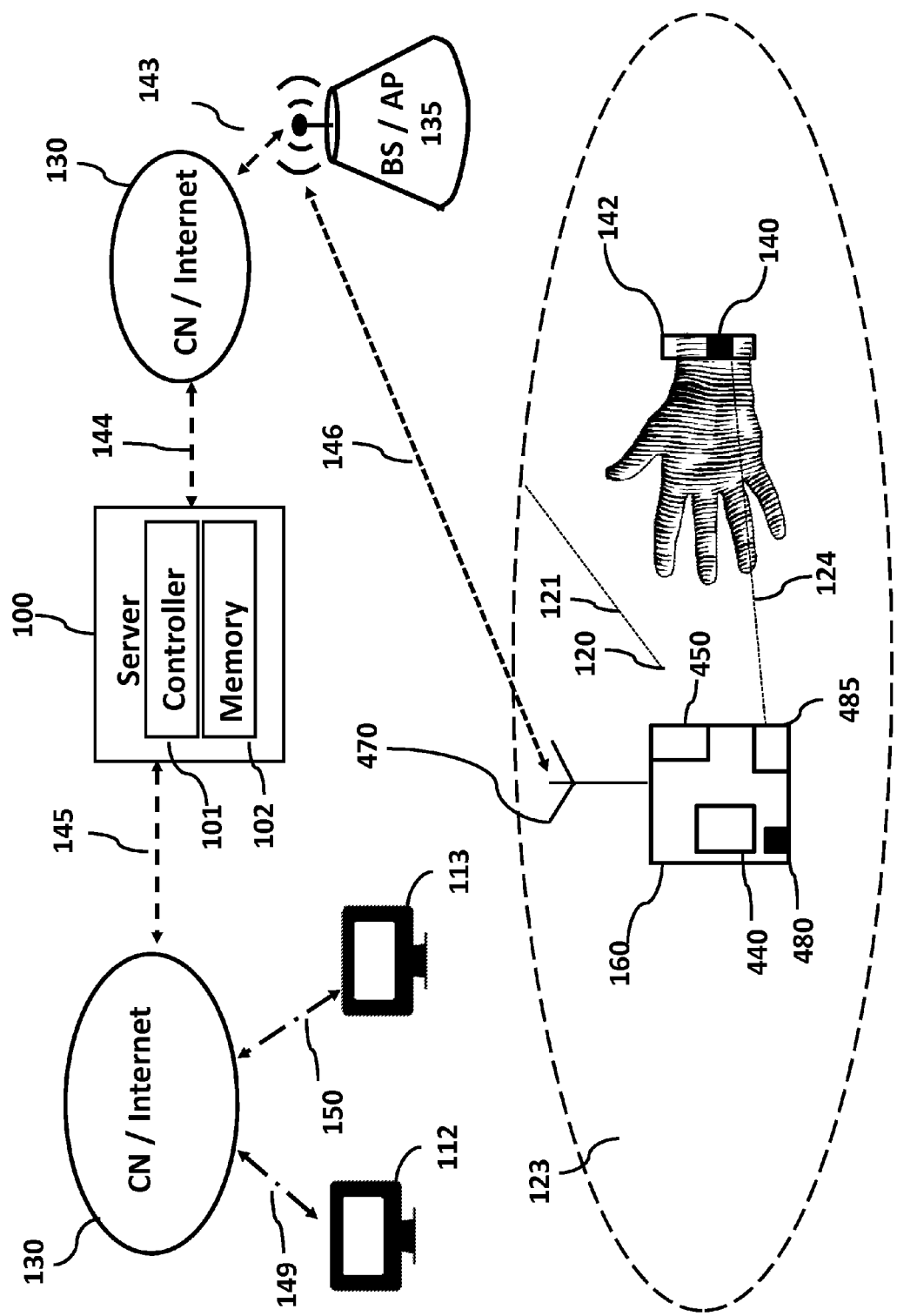
FIG. 1 represents a simplified possible schematic embodiment of the invention describing a system implementation.

FIG. 1 describes one possible system embodiment of the invention.

Target Object 160 represents a general term to characterize an object that 1) is connected; 2) whose attributes can be adapted to the needs, preferences, settings, and permissions that are, at least in part, specific to a user that is paired with it; 3) can be exchanged and paired with a plurality of different users and 4) can adapt to the user that is paired with it. The pairing can be exclusionary or non-exclusionary (more than one user can be paired).

Target Object 160 can be wirelessly connected via Antenna 470 to a base station or access point BS/AP 135 by means of one of the many available radio access wireless standards via data Link 146. Target Object 160 may access the functionalities of Server 100 via data Link 143 and 144 and core network and Internet cloud CN/Internet 130. The person skilled in the art will understand that links, core networks and Internet clouds depicted in FIG. 1 are proxies and representations for a possibly non-homogeneous variety of different standards, technologies and hardware in charge of transporting data from and to different objects such as Server 100, Computer 112, Computer 113, Target Object 160 and Master Object 142.

Target Object 160 may contain, among other modules, an RF-ID Reader 485, an Input-Output User Interface 450, an RF-ID Tag 440 and a Touch Sensor 480. Not all these modules may be necessary for some of the implementations described or claimed.

In one implementation, Server 100 will include a Controller 101 comprising a processor and a Memory 102. A datagram User Datagram ID-A 600, as the one described in FIG. 6, may be stored on Memory 102. Said datagram may contain Personalizations 640, Settings 650 and Permissions 660 associated with ID-A for different Configurable Target Objects Classes 610 of Target Objects 160. If a hierarchical system of objects is implemented, Sub Classes 620 and Sub-Sub Classes 630 may also further define Personalizations 640, Settings 650 and Permissions 660. ID-A represents the User ID associated with User A.

The person skilled in the art will understand that the various classes are exemplary and are merely an illustration of a coding system that can be used to transfer or apply Personalizations 640, Settings 650 and Permissions 660 data attributes that are associated with User A across a plurality of Target Objects 160. Said target objects may have at least some shared attributes, implemented either as hardware or software, that can be customized according to data that are associated with User A and the specific Target Object 160.

The person skilled in the art will also understand that, in one implementation, if User A switches among various Target Objects 160 that are quasi-identical, such as for example standardized mobile phones, a hierarchical system of classes may not be needed and the present invention may equally apply within the domain of a unique Target Object 160. For example, in the case of a popular electronic device such as the iPhone Smartphone, a system of classes that may serve the purpose of allowing the present invention to work across different platforms and target objects may be not necessary. A large user base as well as strategic marketing choices may justify the implementation of a close intra-brand system. The present observations can be applied for all classes of target objects such as, e.g., cars produced by the same company.

FIG. 6 is an example of a hierarchical system. A hierarchical system may be useful when implementing an inter-brand standard. It can also be useful in an intra brand system when target objects, even if from the same manufacturer, differ in their hardware and software solutions. A hierarchical system applies data attributes that belong to lower level classes (i.e. sub classes) only if the specific Target Object 160 meets the conditions and parameters that are contained in classes above. In a hierarchical system, a Target Object 160 may configure or adapt only those attributes related to Personalizations 640, Settings 650 and Permissions 660 that are allowed by its hardware and software capabilities on a best effort basis.

The person skilled in the art will recognize that the present invention can apply to a multitude of different Target Objects 160 that may differ from one another but may also share at least some common attributes. For example, a telephone number is a unique sequence of digits assigned to each telephone subscriber station, telephone line, or since the advent of digital telephony, to an electronic telephony device such as a mobile telephone. The telephone number serves as the address to switch telephone calls using a system of destination routing. It is entered or dialed by the calling party on the originating telephone set which transmits it in the process of signaling to a telephone exchange which completes the call either to another locally connected subscriber or via the public switched telephone network (PSTN) to the called party. A telephone number is an example of an attribute that is common to smart phones across different manufacturers. In one implementation of this invention that will be discussed with reference to FIG. 5, a smart phone may configure itself after the pairing with User A and be authorized by, e.g., Server 100 to receive calls associated with a telephone number that is associated with User A.

In some implementations, Personalizations 640, Settings 650 and Permissions 660 data attributes associated with User A might depend and refer to the location of Target Object 160. For example, for Target Object 160 to work, a field memory describing Permissions 660 may contain the condition that target Object 160 be located within, e.g., a circular area having Radius 121 and centered on Location 120. Location 120 could be a homestead, a school, or a moving reference point (such as a police car) as will be discussed with reference to other figures.

Master Object 142 is represented in FIG. 1 as a bracelet embedding User RF-ID 140 containing a unique serial number that is associated with User A and a User Datagram ID-A 600 stored on Server 100. The person skilled in the art will understand that the bracelet is just one of the many possible implementations. User RF-ID 140 may be stored in clothes, key chains, jewelry, or other electronic equipment such as smart-watches. In some implementations, a User RF-ID 140 may even be implanted in a human body part such as a hand. Alternatively, with reference to smart-watches and wearable gear such as, for example, the Samsung Galaxy Gear (or other hardware in the making by manufacturers such as Google, Microsoft or Apple), in one possible implementation said hardware may contain User RF-ID 140 so that not only Target Object 160 and Master Object 142 could be automatically connected and synced via, e.g., a Bluetooth or other short range connection, but also Target Object 160 may retrieve, via Link 146, data streams, personalization, settings and permissions pertinent to User A in relation to Target Object 160.

The person skilled in the art will also understand that alternatives exist to the carrying of Master Object 142 by User A to pair Target Object 160 with User A's ID-A. For example, Target Object 160 could be connected to a computer via a cable and paired with ID-A manually. A target object could also be paired with ID-A via a login and password associated with User A and via an I/O User Interface 450. Moreover, many of the novel implementations described in this patent application may not necessitate a Master Object 142 but rather the generic association of Target Object 160 with an ID-A which is representative of User A via one of the many possible means and methods. Master Object 142 or RF-ID technologies are just exemplary of one of the many possible implementations and technical solutions.

In certain implementations, Target Object 160 or Master Object 142 may signal to User A that Target Object 160 is ready to be paired with ID-A. For example, Target Object 160 may indicate that one ID-A is available for pairing since it receives an answer from an RF-ID interrogation. Master Object 142 may indicate that a Target Object 160 is available for pairing since it receives an RF-IF interrogation. In other embodiments Target Object 160 or Master Object 142 may signal to User A that Target Object 160 is paired with ID-A.

The person skilled in the art will understand that all types of RF-ID tags described in the background section of the present application can be used to implement various different embodiments of the present invention in many different ways and combinations. In some implementations, a user may power on an active, semi-active or semi-passive tag only when necessary to pair Target Object 160 with the User RF-ID 140 that will be transmitting ID-A (which is associated with User Datagram ID-A 600 stored on Server 100).

Passive tags could be "always on" and available for an interrogation from RF-ID Reader 485. Alternatively, a User A can manually shield User RF-ID 140 from the electromagnetic interrogation of RF-ID Reader 485 via a mechanism acting as an electromagnetic shielding medium.

As a matter of illustration and anticipating some of the examples that will be described in more detail with reference to FIG. 6, an Authority B can be, e.g., a telecommunication carrier, a manufacturer company (producing, e.g., smart phones, smart weapons or cars), a software company whose software is powering Target Objects 160, a law enforcement agency, or a car rental company. The person skilled in the art will understand that the possible examples are extremely numerous and may include any entity that may have some degree of authority or control, either permanently or temporarily, over Target Object 160 and/or User A. Said Authority B may not exist in certain implementations.

With reference to FIG. 6, Column Personalizations 640 contains data attributes that can be controlled and modified by User A only. Column Settings 650 contains data attributes that can be controlled and modified by both User A and a possible Authority B. The column Permissions 660 contains data attributes that can only be controlled or modified by an Authority B.

In one implementation, Computer 112 and Computer 113 are connected to Server 100 via Link 149, Link 145 and Link 150 and core network and Internet cloud CN/Internet 130. Computer 113 describes one of the possible devices that can be used by User A to input data into memory blocks Personalizations 640 and Settings 650 for various Configurable Target Object Classes 610, Sub Classes 620, and Sub-Sub Classes 630. Computer 112 describes one of the possible devices that can be used by an Authority B, having some degree of control over a Target Object 160 or User A, to input some data into User Datagram ID-A 600 memory blocks Settings 650 and Permissions 660.

Figure 5:
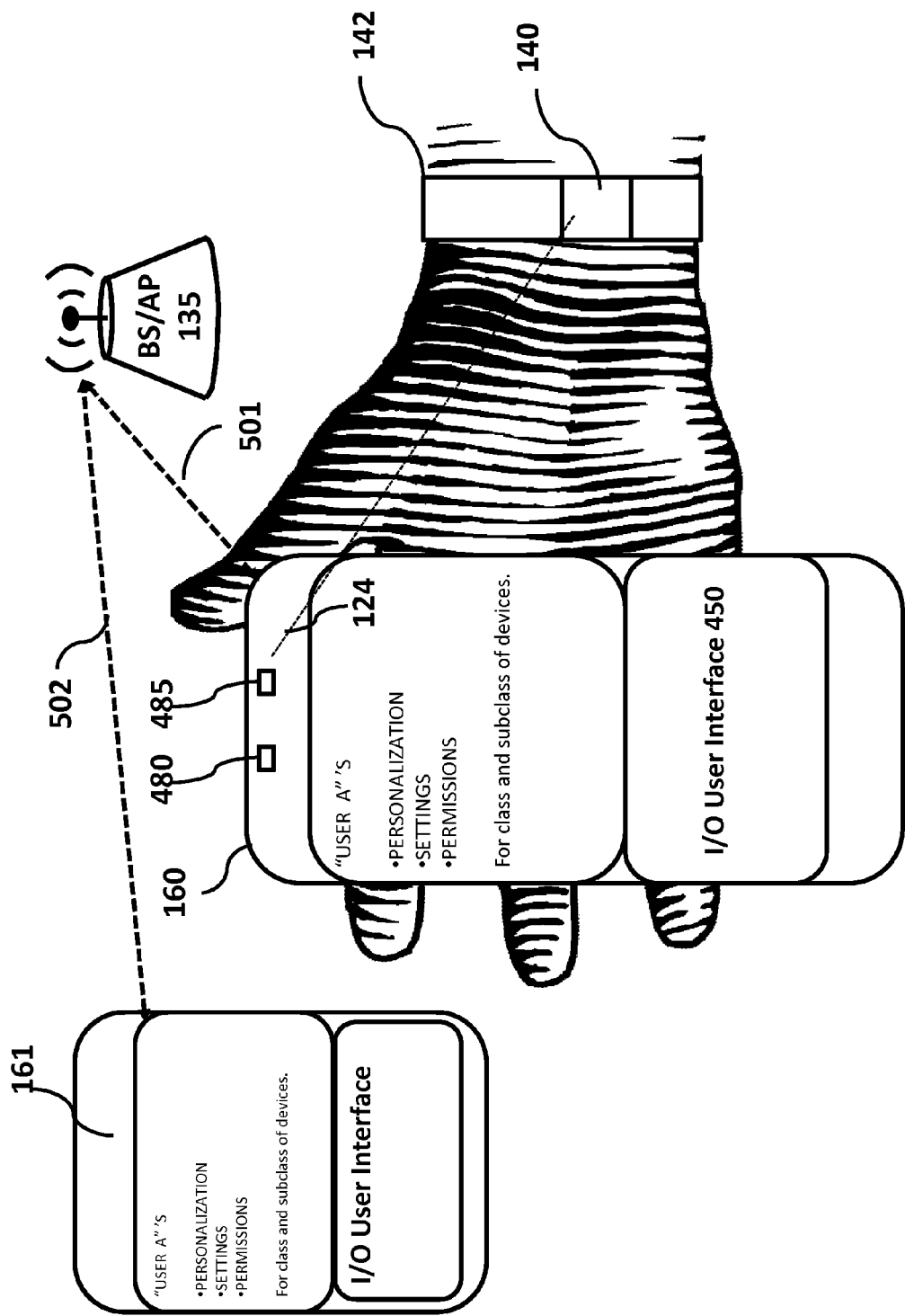
FIG. 5 represents a schematic representation of one aspect of the invention describing a plurality of target objects, namely telecommunication mobile equipment, wherein said equipment may seamlessly incorporate, adapt to, or receive data according to attribute memory fields related to a specific user who is in possession of a master object.

As a matter of illustration and referring to FIG. 6, FIG. 5 and FIG. 1, an exemplary implementation of the present invention follows. Target Object 160 may belong to the configurable target objects class of Wireless Handheld Devices 611, Smart-phones 622, having certain characteristics (such as Brand, Hardware Capabilities or associated carrier) as described in Sub-Sub Class Field 631.

User A, carrying Master Object 142, may grab and hold in his hand Target Object 160. In one implementation, RF-ID Reader 485 may interrogate Master Object 142 and receive a unique User ID such as "ID-A" from User RF-ID 140 via wireless Link 124 wherein said ID-A is associated with User Datagram ID-A 600.

The interrogation by RF-ID Reader 485 can be triggered by various factors depending from different scenarios. The person skilled in the art will know that different scenarios will call for different implementations. The following examples are non-exhaustive. In one implementation, an interrogation can be automatic and periodic. In another implementation, a Touch Sensor 480 module can trigger an interrogation if it senses that Target Object 160 is held in somebody's hands. In another implementation, Accelerometer 477 can trigger the interrogation, by sensing that Target Object 160 is shaken in certain ways. In another implementation, the interrogation from RF-ID Reader 485 can be triggered by some User A's input by means of an Input-Output User Interface 450, e.g., a dedicated button or a predetermined sequence. In another implementation, such as a in vehicle, a Proximity Sensor 474 can trigger the interrogation.

Depending on the type of User RF-ID 140, (active, semi-active, semi-passive or passive), the interrogation modes may vary. If, for example, RF-ID 140 is an active tag that can be powered on and off while continuously broadcasting a unique ID-A associated with User A, the interrogation, the pairing and/or the maintenance of the pairing, may occur according to different scenarios. For example, RF-ID Reader 485 may not even have to interrogate but it may just be in a listening mode for an incoming ID-A from a surrounding Master Object 142 during a predetermined time widow.

After having received ID-A from User RF-ID 140, Target Object 160 may associate said ID-A with its own unique Target Object-ID and send said pair of IDs via Links 146, 143, and 144 to Server 100.

In some implementations, Target Object-ID may uniquely identify Target Object 160. One implementation consists in a dedicated code that may also describe, according to a classification system, the hardware and software capabilities of the target object. In another implementation, it may describe, according to another codification system, the attributes of the target object that can be customized. In another implementation, especially if the customizations for the target objects are standardized or the target object is itself standardized, a Target Object-ID may simply be the IP or the MAC address of Target Object 160. A Target Object-ID could be any unique code serving the purpose of supporting the routing of the communications that are intended for Target Object 160.

In one implementation, Controller 101 in Server 100 may authenticate the pair of IDs to assure that User A associated with ID-A has the necessary permissions to use Target Object 160. Said permissions can be contained in Memory 102 storing User Datagram ID-A 600 associated with User A. If the authentication is successful, Controller 101 in Server 100 may retrieve, use or send to Target Object 160 some of the data contained in Field 641, 651 and 661 that are stored in User Datagram ID-A 600 associated with the unique ID-A under the Sub Class and Sub-Sub Class associated with said Target Object-ID. Said data will ensure that Target Object 160 will abide and conform to the personalization, settings and permissions that are associated with User A, Authority B and Target Object 160. In another implementation, the authentication may occur, at least partially, by means of software and hardware stored and running on Target Object 160 rather than via Server 100.

The person skilled in the art will understand that not only the initial pairing of Target Object 160 with Master Object 142 but also the maintenance of said pairing may follow some security or functional protocol. For example, the receiving of ID-A because of the interrogation of RF-ID Reader 485 may prompt for a password request delivered via Input-Output User Interface 450 to User A. In some implementations, said password can be stored in User Datagram ID-A 600 on Server 100 and can be compared by Controller 101 with the password that User A may enter via Input-Output User Interface 450. The password can be the same or may vary and be specific to different configurable target objects classes and sub-classes.

In one implementation, the maintenance of the pairing between Target Object 160 and Master Object 142 may continue only if RF-ID Reader 485 periodically receives from User RF-ID 140 the unique code ID-A which is associated with user A and User Datagram ID-A 600. In some implementations, in case the token (i.e. ID-A) is not received because of an excessive distance between master and target object, the two objects may un-pair. As discussed in the background section of this application, ID-A can be encrypted or may vary over time according to various security schemes (illustrated in standards such as EPC™ Radio-Frequency Identity Protocols Generation-2) for security and privacy reasons.

Referring again to the example of a smart phone, which will be discussed in further detail with reference to FIG. 5, the person skilled in the art will understand that Target Object 160 which belongs, in this case, to class Wireless Handheld Devices 611, can be automatically configured according to the Personalizations 640, Settings 650 and Permissions 660 data contained in User Datagram ID-A 600 via Link 146. In this embodiment, a SIM card may be unnecessary as a Target Object 160 may download an electronic token that may act as a SIM card.

A configurable smart phone may import a phone number that is personal to User A by downloading settings and permissions from Server 100. One of the possible results of this invention is that smart phones could easily and seamlessly adapt and serve the needs and preferences of multiple users whose preferences, settings, and permissions are stored on Server 100 without the need for personal and dedicated hardware. A user may just grab a target object while wearing or holding a master object and because of the pairing, that target object may start behaving according to certain parameters and settings or it may start receiving data that are customized to that user.

In another implementation, at least part of said Personalizations 640, Settings 650, and Permissions 660 data may not be downloaded by Target Object 160 but rather could be used by Server 100 or other servers to push and receive those data that are relevant to User A and Target Object 160.

In another implementation, Server 100 may force Target Object 160 to behave and respond according to certain parameters and settings that are tailored to User A. An algorithm stored and running on Memory 102 module of said server could be in charge of customizing the experience for User A during the time in which User A is paired with said object.

One of the possible results of the architecture described in FIG. 1 is that a configurable object, such as Target Object 160, may dynamically become an object that is customized to the user with which it is paired. For example, a smart phone may import all of the preferences, settings and permissions according to the user that is holding Target Object 160 in his hand.

According to another implementation, Target Object 160 can be paired with more than one user. For example, a smart phone may have a primary and a secondary user. Target Object 160 may be paired with User A as a primary user and be paired with User B as a secondary user for some functions. For example, the pairing of Target Object 160 with secondary User B may allow Target Object 160 to receive incoming calls that are associated with User B. In the case of a smart phone, the pairing to the same Target Object 160 by multiple users may work as a call forwarding functionality wherein Target Object 160 will receive all the incoming calls associated with a plurality of secondary users. In another implementation, the system could work like a device having multiple virtual SIM cards wherein multiple SIM cards are the result of multiple authentications and pairings of more than one master object to the same Target Object 160.

In one possible implementation, Target Object 160 is associated with a hierarchy concerning users wherein a finite set of functionalities or capabilities associated with said Target Object 160 are distributed among users who are contemporaneously paired with the same Target Object 160.

In another implementation, User A may automatically modify the Personalizations 640 and Settings 650 data attributes stored in User datagram ID-A 600 for the class, sub class and sub-sub class to which Target Objects 160 belongs via its Input-Output User Interface 450. For example, if User A manually customizes the Settings 650 and Personalizations 640 of Target Object 160 with which he is currently paired, those customizations may automatically be saved in User Datagram ID-A 600 for the class, sub class and sub-sub class of configurable target objects to which Target Object 160 belongs.

One possible consequence of the above-mentioned solution is that, as soon User A pairs with a NEW Target Object 160 that has some common customizable attributes with an OLD Target Object 160 that User A has used in the past, the settings and customizations that User A has imposed via Input-Output User Interface 450 to OLD Target Object 160 may be imported and imposed to NEW Target Object 160. For example, in a rented car, settings like temperature, GPS waypoints, driver seat position or any data that have been input by User A via an Input-Output User Interface 450 belonging to OLD Target Object 160 can be saved on Server 100 and automatically exported to the next car (NEW Target Object 160) that User A will rent or drive.

Figure 2:
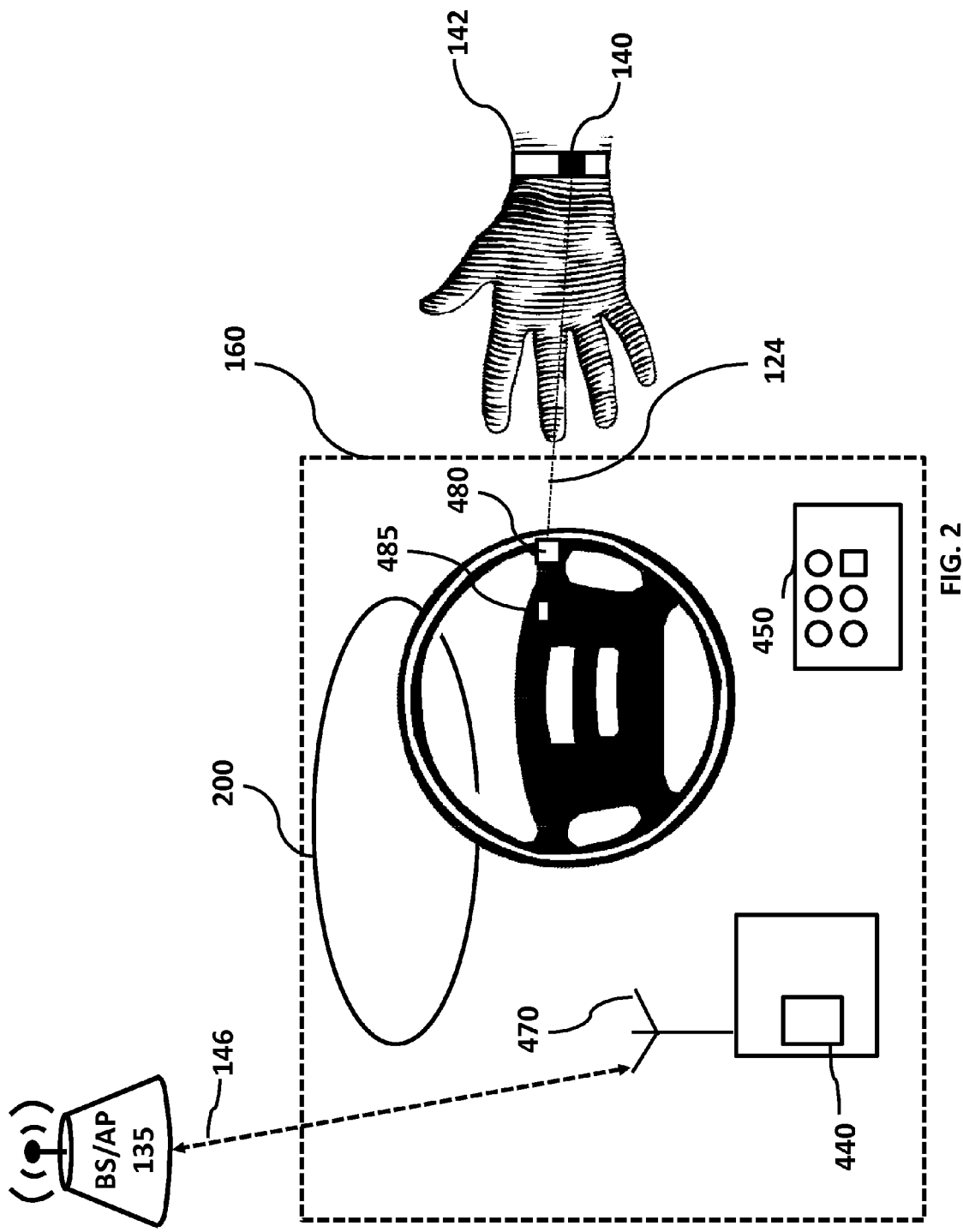
FIG. 2 represents a simplified possible embodiment of the invention describing a system vehicle implementation.

FIG. 2 refers to an embodiment wherein Target Object 160 is a vehicle such as a car. Driver User A may be carrying Master Object 142. Upon his approaching or entering the car, RF-ID Reader 485 may interrogate Master Object 142 and receive a unique ID-A (associated with User Datagram ID-A 600 and User A) from User RF-ID 140 via wireless Link 124. After having received ID-A, Target Object 160 may associate said ID-A with its own unique Target Object-ID and send said pair of IDs via Antenna 470 and Link 146 to Server 100. Members of the same family, e.g., may have different User IDs and share the same car.

In some implementations, in Server 100, an algorithm stored on Memory 102 may provide for the authentication of the pair ID-A and Target Object-ID. After the authentication, Target Object 160 may be authorized to retrieve from Memory 102 at least some of the data related to User A and Target Object 160 via Link 146 contained in User Datagram ID-A 600 for the Configurable Target Object Class 610, Sub Class 620 and Sub-Sub Class 630 to which Target Object 160 belongs. Said data may comprise those Personalizations 640, Settings 650 and Permissions 660 associated with ID-A that are relevant to Target Object 160. Non-limiting examples of personalization may include favorite radio stations, driver seat position, temperature and GPS Stored Locations. Examples of Settings 650 may include driving settings and functions such as "Consumption Optimization" and "Speed Limiter." Examples of Permissions 660 may include "Permission to drive outside a certain Geofenced Area", or cross a state border, or "Permissions to Charge Automatically on a Company Credit Card" tolls or other expenses.

Similarly to the case of the smart phone described previously, Personalizations 640 and Settings 650 that are defined by User A via Input-Output User Interface 450 may automatically be synced and stored on Server 100 in User Datagram ID-A 600, either in real time, when Input-Output User Interface 450 is used by User A, or periodically. One of the consequences of the present invention is that User A may be able to switch across a plurality of target objects and benefit from having already introduced his settings and preferences previously in one OLD Target Object 160 that is sharing at least some attributes belonging, e.g., to the same class or sub class or sub-sub class. In one implementation, data attributes may transfer form a target object to another target object that is sharing at least some common attributes with the previous one as soon as User A pairs with a NEW Target Object 160.

The person skilled in the art will understand that the possible examples of personalization, settings and permissions are numerous and it would be impractical to name but a few as a matter of illustration. In general, an attribute of a target object is a modifiable quality or characteristics of the target object. For example, in a vehicle, "temperature settings" for the occupants of the vehicle is an example of attribute. A stream of data information that a target object, such as augmented reality glasses, receives is another example of attribute. The "capability of being functional" for a personal "smart weapon" is another example of attribute, in this case "attribute permission".

The system of classes and subclasses described in this patent application is an example of a best effort translation of settings, customizations and permissions attributes that may not be the same for every possible Target Object 160. For example, some cars may have certain functionalities that are absent in another cars. A hierarchical class system may provide a way to serve target objects that are not identical (but belong at least to a generic top-level class). For example, with reference to the case of a smart phone a 1) top level class could be "smart phones"; 2) a sub class could be "Android smart phones"; 3) a sub-sub class could be "Android smart phones running the KitKat 4.4 operative system". Similar examples can be made for vehicles and many other classes of products, hardware and software.

The technology of networked vehicles may bring new functionalities to vehicles in the future. For example, the windshield of a car may function in a similar way as a pair of augmented reality glasses as described in U.S. Pat. No. 8,428,873 granted on Apr. 23, 2013 or as described in U.S. Pat. No. 8,379,043 granted on Feb. 19, 2013. In one embodiment of the present invention, once User A is paired with Target Object 160, said augmented reality Windshield 200 may augment objects or provide information to the driver according to personalization and settings that are peculiar to said User A.

In some implementations, the type, the quality and the quantity of information that said augmented reality Windshield 200 might provide will vary according to the age of the driver, his interests or the list of his personal contacts. As in the previous examples, data related to users and target objects can be stored in User Datagram ID-A 600 in Settings 650, Personalizations 640 and Permissions 660 and can be pushed via Link 146 into a memory module of Target Object 160 to be used by the onboard computing module and memory module to provide for a customized experience. For example, the system may augment User A's contacts, i.e. people who are in User A's contact list and are within a certain distance from Target Object 160. As another example, the onboard computing module may automatically adjust the size of fonts or the augmentation functions according to User A's sight, reflexes (i.e. reaction time), time of the day and visibility to improve safety.

In another implementation, the data contained in User Datagram ID-A 600 can be used by Server 100 or by another server to generate and push a stream of commands, permissions and data via Link 146 to Target Object 160 to provide for a customized experience. Differently from the previous example, Target Object 160 may receive only commands and information while Server 100 could perform the bulk of the computing activities in a "cloud mode". In certain implementations, a hybrid approach can be possible as certain functionalities can obtained via an onboard computing module while other functionalities can be outsourced to Server 100.

In certain implementations, if User A, who is paired with Target Object 160, is above a certain age the data contained in Permissions 650 may electronically constrain the vehicle performances by limiting the acceleration and speed of said vehicle. In other implementations, other limitations may apply to users whose license has been granted for less than a certain period, have a record of driving violations, or have a criminal record that justifies the imposing of certain restrictions to their ability to conduct a vehicle.

Google driverless car is a project by Google Inc. that involves developing technology for autonomous cars. The software powering Google's cars is called Google Chauffeur. Similarly, Nissan Motor Co. has announced its plans for introducing to the market the first self-driving car by 2020. It is conceivable that in the future a self-driving mode for vehicles may become a default mode of transportation rather than an optional mode. In one embodiment of the present invention a manual mode of transportation could be available only to certain classes of users, such as User A, wherein User Datagram ID-A 600 contains the necessary permissions that are stored in Permissions 660.

Figure 3:
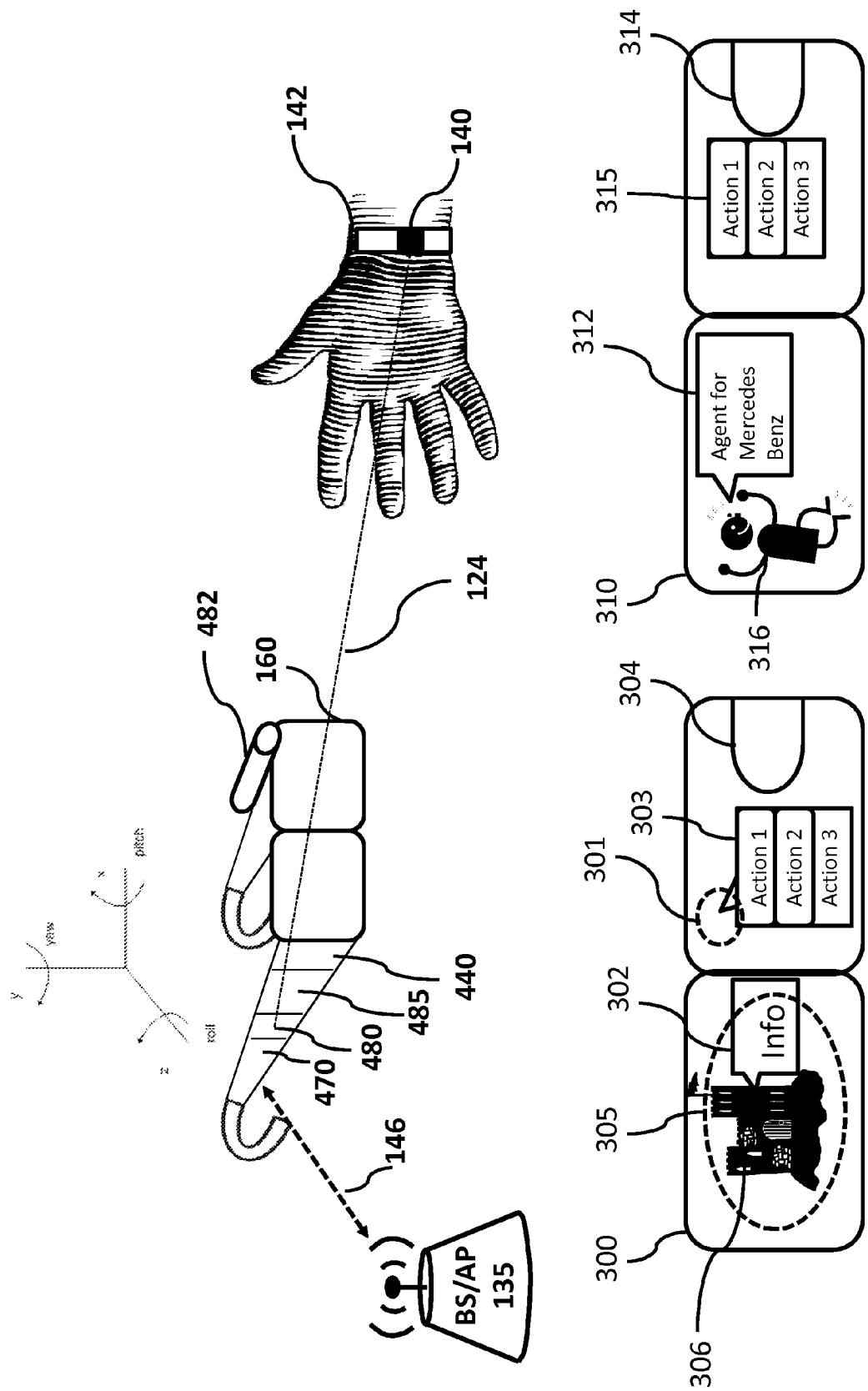
FIG. 3 represents a simplified possible embodiment of the invention describing an augmented reality system implementation.

FIG. 3 represents an exemplary embodiment of a system and apparatus, wherein Target Object 160 is a pair of augmented reality glasses. In one embodiment of the invention, Target Object 160 may include, among other modules, an RF-ID Reader 485, an RF-ID Tag 440, Antenna 470, a Video Camera 482 and a Touch Sensor 480. The modules described in FIG. 3 are just exemplary. The person skilled in the art may also refer to FIG. 4 for a description of other modules that might constitute hardware useful to implement some of the embodiments described with reference to FIG. 3.

Master Object 142 is represented, just as an example, as being a bracelet embedding User RF-ID 140 containing a unique ID-A associated with User A and User Datagram ID-A 600. In one embodiment of the invention, in the case of augmented reality glasses, where the input/output capabilities available to a user may be limited, it might be convenient to be able to pair Target Object 160 with RF-ID 140 and access the data stored in User Datagram ID-A 600 on Server 100 so that, e.g., multiple users can exchange and share the same Target Object 160 and have a customized experience that factors in the various preferences, settings and permissions that are peculiar to the different users that may be paired with Target Object 160.

In one implementation, Touch Sensor 480 module is capable of sensing when User A is wearing the augmented reality glasses. A positive indication by Touch Sensor 480 may prompt the interrogation by RF-ID Reader 485, the establishment of the pairing, and the maintaining of the pairing. This is a general example that can be extended to any wearable device. The pairing can also be prompted via a generic or dedicated pairing button that User A can manually activate.

In one implementation, since the response that RF-ID Reader 485 will receive will be the strongest from Master Object 142 because of the proximity to RF-ID 140, Target Object 160 may distinguish which Master Object 142 it should pair with. In one implementation, after the pairing, RF-ID Reader 485 may periodically interrogate RF-ID 140 to ensure that the pairing with Target Object 160 should be maintained. Many schemes and algorithms can be used to maintain the pairing with the same RF-ID 140 over an extended period. In certain implementations, master objects and target objects may come out of the box already pre-paired when User A buys them. In other implementations, Target Object 160 could be unable to be functioning without the proximity of pre-paired Master Object 142 so that, if target object is lost, it will be useless to its finder.

With reference to FIG. 3, Visual Field 300 may represent one example of what User A might be able to experience while wearing said augmented reality glasses. In one implementation, Visual Filed 300 might be subdivided into areas. For example, Visual Area 305 might be dedicated to information that can be retrieved from objects within Visual Field 300. For example, an Information Menu 302 or an Interaction menu 303 can be retrieved by keeping an object within Visual Area 305 for a predetermined period. In another implementation, User A might prompt menus by interacting with a dedicated button placed on the glasses frame while keeping the object within, e.g., Visual Area 305.

In one implementation, Visual Area 301 might be dedicated to interactions with objects that are within Visual Field 300. User A might prompt said Interaction Menu 303 by keeping an object within Visual Area 301 for a predetermined period. In another implementation, User A might prompt Interaction Menu 303 by interacting with a dedicated button while keeping the object within Visual Area 301 or generically within Visual Field 300. In one implementation, User A could utilize Interaction Menu 303 via User A's Finger 304 when it is within the visual field of Video Camera 482. A dedicated algorithm may be in charge of recognizing Finger 304 as an actuator for the I/O User Interface 450.

In one implementation, a software running and stored on Memory 102 or alternatively running and stored on a local Memory 433, by analyzing the data captured by Video Camera 482, may provide the input/output functionalities that are necessary to interact or "communicate" with Object 306 (a castle in the example of FIG. 3). For example, User A could buy a ticket to access the castle by using Interaction Menu 303. In another implementation, User A could use Interaction Menu 303 to establish a communication with another user who is augmented within Visual Field 300. In another implementation, User A may communicate with Object 306 via Interaction Menu 303 wherein Action 1, for example, corresponds to the placing of a voice call to a touristic information office related to the castle.

In one implementation, Interaction Menu 303 can adapt to the various objects that are within Visual Field 300 according to a User Datagram ID-A 600 that is stored on Memory 102. Said datagram contains Personalizations 640, Settings 650 and Permissions 660 related to User A that is paired with target Object 160 and is keeping Object 306 within Visual Field 300.

In one implementation, the data contained in User Datagram ID-A 600 are supplemented by other data stored in other datagrams in various servers if said data associated with the objects are to be augmented by Target Object 160 are necessary or useful to algorithms delivering at least some functionality, regardless of whether described in this patent application.

The person skilled in the art will understand that, to enable some of the above-described functionalities, Target Object 160 may include some of the modules that will be described with reference to FIG. 4. For example, module Locationing 410 may provide the location of Target Object 160 via one of the many locationing technologies, both indoors or outdoors, that are currently available such as GPS, triangulation, RF-ID positioning, Wi-Fi signal strength mapping and many others. Data generated by Compass 476 and Gyroscope 481, combined with data pertaining to the precise location of Target Object 160 and an Object 306, may be used by an algorithm running, e.g., on Server 100 to determine which objects fall within Visual Filed 300, Visual Area 305 or Visual Area 301. Some of those objects, such as Object 306, may prompt an Interaction Menu 303 or an Information Menu 302 according to said algorithm and the data associated with those objects. In another implementation, the algorithm providing at least some of said functionalities may run or be stored on a Memory 433 of Target Object 160. Gyroscope 481 may provide the data of yaw, roll and pitch that are necessary for Target Object 160, e.g., augmented reality equipment, to determine its orientation and to determine which users or objects fall within Visual Field 300.

In one implementation, if the data provided by Locationing 410, Compass 476, and Gyroscope 481 combined with the data related to the location of Object 306, are precise enough, an algorithm running on Server 100 may prompt Interaction Menu 303 or Information Menu 302 if Object 306 is kept within, Visual Field 330, Visual Area 305 or Visual Area 301 for a predetermined period.

In one implementation, User A may prompt Interaction Menu 303 by placing Finger 304 in front of Video Camera 482 and within Visual Filed 300.

In another implementation, Target Object 160 can be paired via RF-ID Tag 440 with an RF-ID reader associated with Object 306, a castle in this example. Said pairing may authorize Target Object 160 to access certain functionalities and information that are associated with said Object 306. For example, Target Object 160 could receive premium content concerning the castle.

With reference to FIG. 3, Visual Field 310 may represent one alternative example of what User A might be able to experience while wearing said augmented reality glasses. In this implementation, Visual Filed 310 represents information that can be retrieved from users within it. For example, User B 316 who is also wearing or carrying a target object that is associated with his own User Datagram ID-B (possibly stored on Server 100 or other server in the cloud), might want to allow users such as User A to retrieve information that is associated to his persona. For example, with reference to U.S. patent application Ser. No. 13/541,737 titled "Method and apparatus for a principal/agent based mobile commerce" filed on Jul. 4, 2012 (published as US 2014-0011515 A1 and having the same inventor as the present application), User B could be an agent for a particular brand such as "Mercedes Benz". According to a certain algorithm working according to certain permissions, settings, and analytics data, User A may receive an indication that User B is an agent for said brand via an Information Menu 312 and initiate business discussions.

In another implementation, User A might prompt Interaction Menu 315 by placing Finger 314 within Visual Field 310. Said placing of the finger may prompt an Interaction Menu 315 that could be modeled according to User B's permissions and settings. For example, User B may allow User A to send a notification for an interaction or a message via Interaction Menu 315. Said interaction or message could be delivered to User B via his augmented equipment or other equipment.

In another implementation, related to dating, Information Menu 312, may display information regarding the status of User B. For example, users belonging to the same dating network may be able to see other users' status (e.g., "available" to dating), augment only those available to dating, or retrieve and display information via Visual Field 310 that may be supporting the decision of User A to interact with User B.

As described with reference to FIG. 2, some settings and preferences can be input by User A via Input-Output User Interface 450 and may transfer automatically to User Datagram ID-A 600 on Server 100 to be reused, at least partially, across different Target Objects 160 belonging to the same class and/or sub classes. In one implementation, related to augmented equipment, Video Camera 482 can be used to provide data for an algorithm stored, e.g., on Server 100 having object recognition capabilities. Said algorithm may, e.g., be used to build a database pertaining to User A's interests or activities. Said database can be one of the many memory modules in User Datagram ID-A 600 or it can be stored in another database on another server.

The person skilled in the art will understand that the data generated by the continuous object recognition can be reused across different platforms or classes of Target Objects 160 associated with User A. For example, the analytics of the data can be used to refine the output of a search engine if said search engine functionality can be linked to User A.

In one embodiment, said object recognition function may start only when Target Object 160 or an algorithm stored on Memory 102 of Server 100 detects that Visual Field 300 does not change over time. This may signal to the algorithm that the objects that are within Visual Field 300 have some significance to User A. In one implementation, the longer an object is kept within Visual Field 300, the more said object may climb a ranking of interests that describes User A.

Analytics of visual patterns related to users may populate databases that can be used to serve advertisements directly via target Object 160 or via other means such as generic Internet browsing. Analytics of visual patterns may also be used to understand users' behavior for different classes of users. Analytics of data collected via Video Camera 482 can also be used to refine and provide augmentation algorithms that may enhance and dynamically refine the user experience. For example, if the analytics and patterns of the visual data collected via Video Camera 482 indicate that User A has an interest in certain categories of objects, then the system may augment similar objects within Visual Field 300.

In another embodiment, a software recognition system may analyze Visual Field 300 and compare the objects with images contained in a database of registered trademarks for building a profile of User A and serve advertisement connected to those trademarks.

In another embodiment, Optical Characters Recognition (OCR) software may analyze or recognize text in front of User A and within Visual Filed 300 to derive user's interests, preferences and habits.

The literature related to software used for the purpose of visual objects recognition and classification is extensive. Just to cite a few examples, U.S. Pat. No. 8,583,647, titled "Data processing device for automatically classifying a plurality of images into predetermined categories", discloses an image processing technique for automatically classifying a plurality of images into predetermined categories.

Microsoft Corporation, among many others, has filed patents and applications in this area such as U.S. 20090310854, U.S. 20090292685, U.S. 20090290802, U.S. Pat. No. 8,249,366, U.S. Pat. No. 8,239,333, U.S. Pat. No. 8,219,511, U.S. Pat. No. 8,180,766, and U.S. Pat. No. 8,175,847. Orcam Technologies LTD has also filed two patent applications in this area such as U.S. 20120212593 and U.S. 20130169536.

Figure 4:
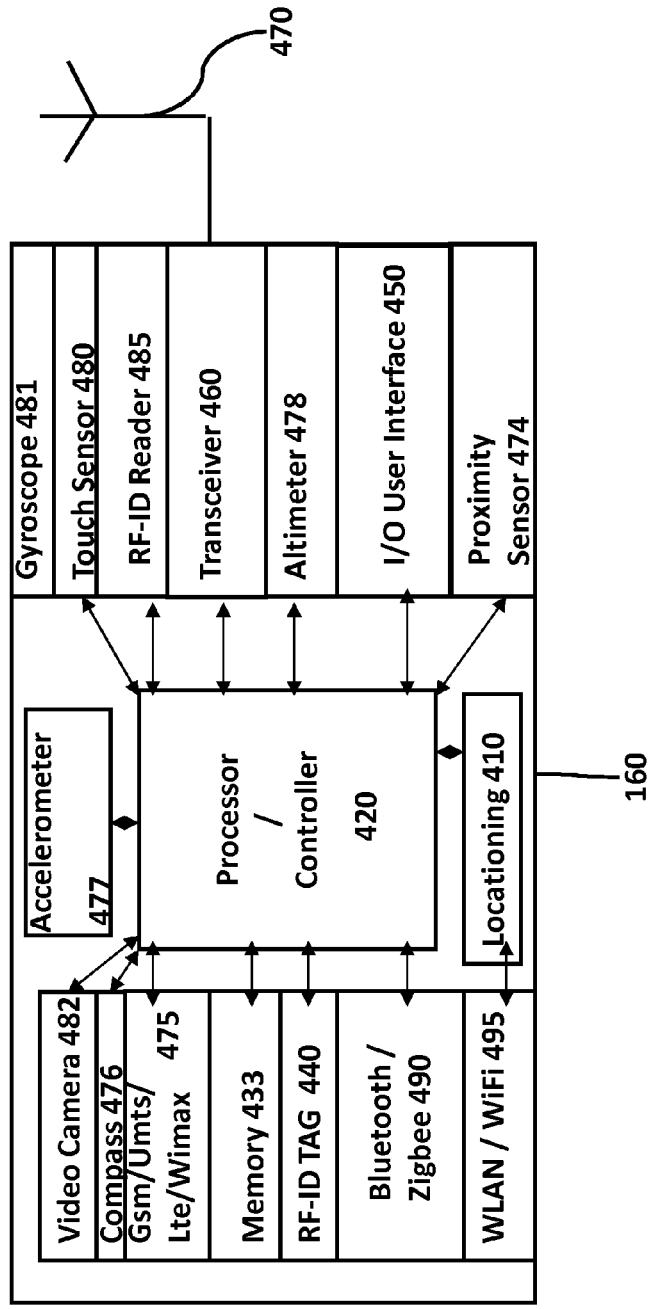
FIG. 4 represents a schematic representation of one possible embodiment of a target object equipment, in this case telecommunication mobile equipment.

FIG. 4 is an example of Target Object 160 apparatus wherein said Target Object is a smart phone. The person skilled in the art will understand that not all the modules that are described are necessary to implement every embodiment but rather different embodiments can be implemented by using only some of the modules described. The person skilled in the art will also understand that the modules in FIG. 4 are just representations of certain functions and that, for example, a Transmission Module GSM/UMTS/LTE/WiMAX 475 is generically representative of a wireless communication module independently from the physical layer, Mac layer, application layer, or underlying telecommunication standard or technology used.

In one implementation, Target Object 160 may support simultaneous transmissions of cellular (e.g., GSM/UMTS/LTE/WiMAX) and non-cellular (e.g., WLAN 495 or Bluetooth®/ZigBee 490) radio carriers. A Transmission Module GSM/UMTS/LTE/WiMAX 475 could be the medium by which target Object 160 communicates with Server 100 via base stations and core network equipment. The person skilled in the art will understand that with the progress of telecommunication technologies the radio waves carrier types that can be employed to carry data by Master Object 142, Target Object 160 and base station or access point BS/AP 135 will vary. For example, in some implementations, the communications among different modules of the system described in FIG. 1 may occur via visible light or sound.

The person skilled in the art will appreciate, even more with reference to FIG. 6, that the present invention can be applied to many diverse engineering fields as long a Target Object 160 can be paired with a User A. Consequently, FIG. 4 may not be fully representative of many scenarios and apparatuses to which the teachings of the present invention apply.

As discussed, FIG. 4 provides a schematic example of a Target Object 160 apparatus in accordance with one embodiment of the present invention wherein said object is, e.g., a smart phone. FIG. 4 may also represent a personal digital assistant, a laptop computer, an e-book reader, an entertainment console or controller, wearable hardware such as augmented reality headsets, a tablet computer or any other equivalent portable device that may be used to communicate with other mobile equipment or with Server 100. FIG. 4 may also be representative of an apparatus embedded in a more complex system such as, e.g., a vehicle or a smart weapon, as discusses with reference to FIG. 2 or 6.

Target Object 160 may include at least one Processor/Controller 420 and at least a Memory 433 comprising computer program instructions. The at least one Processor/Controller 420 can be embodied by any computational or data processing device, such as a central processing unit (CPU) or application specific integrated circuit (ASIC). The at least one Processor/Controller 420 can also be implemented as one or a plurality of controllers.

Memory 433 may contain application software running on Target Object 160. Memory 433 may also store at least portions of User Datagram ID-A 600 that are most relevant to the location, time, and user profile settings associated with said Target Object 160 and User A. In one implementation, Target Object 160 can retrieve and store portions of said datagrams to expedite the system's performances according to various parameters such as location, time windows, user settings and preferences.

The at least one Memory 433 can be any suitable storage device, such as a non-transitory computer-readable medium. For example, a hard disk drive (HDD) or random access memory (RAM) can be used in the at least one Memory 433. The at least one Memory 433 can be on the same chip as the at least one Processor/Controller 420, or may be separate from the at least one Processor/Controller 420.

The computer program instructions may be any suitable form of computer program code. For example, the computer program instructions may be a compiled or interpreted computer program. The at least one Memory 433 and computer program instructions can be configured to, with the at least one Processor/Controller 420, to cause a hardware apparatus such as Target Object 160 to perform any process described herein.

Target Object 160 may also include an I/O User Interface 450. I/O User Interface 450 may allow inputting of information and data via a touch screen or a QWERTY keyboard or other methods described with reference to the description of previous figures. In one implementation, I/O User Interface 450 may also include, e.g., a vibrating notification module, a microphone, a speaker, a monitor or a screen to provide augmented reality functionalities or any combination thereof. Target Object 160 may include one or more Transceiver 460 configured to operate in conjunction with one or more Antenna 470 to communicate wirelessly.

In one embodiment, the Antenna Unit 470 may support beam forming and/or multiple input multiple output (MIMO) operations. As those skilled in the art know, MIMO operations may provide spatial diversity, which is to overcome difficult channel conditions and/or increase channel throughput. Antenna 470 may include antenna tuning and/or impedance matching components, RF power amplifiers, and/or low noise amplifiers. Target Object 160 can be optimized to support multiple transceivers using multiple wireless standards.

In one example embodiment, Target Object 160 may support simultaneous transmission of cellular (for example, GSM, UMTS, LTE, WiMAX) and non-cellular (for example, WLAN/WiFi 495 or Bluetooth®/ZigBee 490) radio carriers. A Transmission Module GSM/UMTS/LTE/WiMAX 475 may allow Target Object 160 to communicate with Server 100.

The locationing component of the invention can be advantageously implemented in many different ways. In one possible implementation, Locationing 410 module, e.g. GPS, may provide the location of Target Object 160 to Server 100 via Link 146. GPS module capabilities can be augmented by data provided, for example, by Altimeter 478. When in closed environments, such as a shopping mall, the Locationing 410 module may use other technologies such as, e.g., choke points, grids, location indexing and presence reporting for RF-ID tagged objects.

As described in U.S. Pat. No. 5,594,448 titled "Highly Accurate RF-ID Positioning System", RF-ID TAG 440 can be interrogated by indoor RF-ID readers that have been strategically placed. Said choke point indoor positioning system based on RF-ID readers can be used in combination with Compass 476, Altimeter 478 and Accelerometer 477 to provide an accurate tracking of the position of Target Object 160 via inertial measurements within enclosed premises where a GPS module or other locationing systems may not work or be sufficiently precise. Other techniques used to provide the location data are angle of arrival, time of arrival and received signal strength indication. The literature in this field is vast.

In some implementations, RF-ID TAG 440 can be used to provide a unique ID for Target Object 160 namely Target Object-ID. Said Target Object-ID can be paired with the unique ID-A associated with User A in Server 100 to point to the memory location where User Datagram ID-A 600 is stored.

In other implementations, Target Object-ID can be defined according to a classification system so that, when Server 100 receives both the ID-A and the Target Object-ID, the Personalizations 640, Settings 650 and Permissions 660 are applied to Target Object 160 within the constraints imposed by the differences in hardware and software among the various target objects (belonging at least to the same Configurable Target Object Class 610). In other implementations, partly discussed previously with reference to other figures, the code used to identify Target Object 160 can be different from the code stored on RF-ID TAG 440.

Proximity Sensor 474 can be used to trigger or regulate the interrogation of RF-ID Reader 485 of a possible nearby Master Object 142 so that a unique ID-A associated with User A is received from RF-ID 140 and is sent to Server 100. Video Camera 482, Compass 476 and Gyroscope 481 may provide for the functionalities that have been discussed, e.g., with reference to the description of FIG. 3.

The person skilled in the art will understand that not all the modules that are described in FIG. 4 may be necessary in all embodiments but rather that certain embodiments can be implemented by using subsets of the modules described. Conversely, in some other embodiments, such as e.g., a smart weapon, other modules or hardware, in addition to what described with reference to FIG. 4, are needed to provide for the full functionalities as described.

FIG. 5 represents an exemplary embodiment of the invention wherein Target Object 160 is a smart phone. In this embodiment, a Touch Sensor 480 sensing User's A hand on said Target Object 160 may cause: 1) an interrogation signal from RF-ID Reader 485; 2) a response signal from User RF-ID 140; and ultimately 3) the pairing of Target Object 160 with Master Object 142 previous authorization of Server 100 received via Link 501. The interrogation and response of RF-ID Reader 485 and User RF-ID 140 may occur via Link 124. The person skilled in the art will understand that the triggering of the pairing may occur according to different modalities. For example, in one implementation a button may trigger the pairing.

In another implementation, the interrogation may occur automatically because, e.g., 1) no other user is paired with Target Object 160, and 2) ID-A is pre-authorized to pair 3) and Target Object 160 via RF-ID Reader 485 is automatically and periodically scanning for a user to be paired.

In one implementation, Target Object 160 may store a token from Server 100 so that when an ID-A has been previously authenticated, Target Object 160 may not need to probe Server 100 for successive authentications for a pre-determined period. Authentication may occur locally between Target Object 160 and Master Object 142 according to various schemes.

The person skilled in the art will also understand that the un-pairing function is as much important as the pairing one. For example, in some embodiments the pairing can be maintained as long as RF-ID Reader 485 periodically interrogates and receives a response from User RF-ID 140. In other implementations, the un-pairing may occur only manually via I/O User Interface 450. In another implementation, a distance parameter between RF-ID 140 and RF-ID Reader 485 can be implemented based, for example, on the timing of the response received by RF-ID Reader 485. By using the measured delay, an algorithm stored on Memory 433 can calculate a distance value. If the value of distance exceeds a predetermined value Processor/Controller 420 may trigger the un-pairing.

In another implementation, the decision process to un-pair can be carried on via Server 100. The person skilled in the art will understand that many schemes can be used for timers and warnings to regulate said un-pairing. For example, Target Object 160 may issue an audible warning before the un-pairing. In another implementation, Master Object 142 may produce an audible warning whenever it does not receive a periodic interrogation from a paired object. In one embodiment, a User A or an Authority B, having some degree of control over Target Object 160, can adjust an un-pairing distance threshold parameter between User RF-ID Reader 485 and User RF-ID 140. In other implementations, User A or Authority B can adjust 1) the timers for the periodic interrogation by RF-ID Reader 485; or 2) any "out of range" warning to the user preceding the un-pairing; or 3) any hysteresis period preceding the un-pairing.

In the embodiment described in FIG. 5, Target Object 160 may seamlessly and instantaneously turn into a personal device for the use of a User A who is paired with it. Any input and adjustments to said Target Object 160 via I/O User Interface 450 by User A can be translated and synced in Personalizations 640 and Settings 650. In some implementations, Server 100 may send or receive data authorizing Target Object 160 to receive calls directed to a telephone number associated with User A (receiving number). In other implementations, Server 100 may send or receive data authorizing Target Object 160 to place calls wherein the calling number is a telephone number associated with User A (calling number). In one implementation, said receiving number and calling number can be different. In another implementation, they can be the same.

With reference to FIG. 5, if User A grabs a New Target Object 161 and pairs with it, all Personalizations 640, Settings 650 and Permissions 660 may transfer or may be applied to New Target Object 161 via Link 502.

In one possible implementation, it is possible to operate multiple pairings so that User A can pair with more than one Target Object 160 at the same time. Certain attributes and functionalities may contemporaneously belong to multiple devices that are simultaneously paired with the same user such as, for example, accessing certain files from multiple devices. Other attributes may only pertain to either Target Object 160 or New Target Object 161 at the same time. In one implementation, the pairing of User A with New Target Object 161 will automatically cause the un-pairing of the same user with Target Object 160.

FIG. 6 represents an exemplary datagram wherein Personalizations 640, Settings 650 and Permissions 660 data attributes (that are associated with model User A and/or a plurality of Configurable Target Object Classes 610) are stored. The person skilled in the art will understand that User Datagram ID-A 600 is used as a matter of illustration for explaining the general underlying concepts. In fact, in some implementations, some data, fields, or columns of the datagram can be distributed and stored over multiple servers and multiple datagrams. FIG. 6 is merely an exemplary simplified datagram wherein data and memory fields pertaining to a user and data and memory fields pertaining to various classes of Target Objects 160 are stored in the same Memory 102.

The person skilled in the art will understand that data pertaining to certain functionalities discussed with reference to previous figures could be stored on multiple servers as a part of an integrated system of Personalizations 640, Settings 650 and Permissions 660 associated with a plurality of users and/or a plurality of target objects.

For the purpose of illustrating the underlying concept, with reference to Wearable Devices 614, Augmented Reality Glasses 627, and the example Object 306 (a castle) discussed in connection with FIG. 3, the data or permissions related to said Object 306 could be contained on one or multiple servers and not only on Server 100. Data and permissions related to objects or users can be imported or stored on a needed basis by either Target Object 160 or Server 100. Info Menu 302 and Action Menu 303 described in FIG. 3 are just two examples of data, information or functionalities that can be associated with real world objects (such as Object 306) that have been mapped into digital databases.

In another example, discussed with reference to FIG. 2 wherein Target Object 160 is a vehicle paired with User A, data (such as age) and driving records (such as tickets or driving experience) related to said User A can be stored on a governmental agency server and can be retrieved by Server 100 when needed. In another implementation, certain Permissions 660 might be contingent to User A's driving records. For example, a rented car may function only in a safe mode for less experienced drivers or drivers with a record that indicates a risk-taking predisposition.

Column Configurable Target Object Classes 610 may contain general classes of target objects that can be paired with User A via a Master Object 142 or other pairing means as explained previously. Since these are broad classes, the level of personalization, settings or permissions related to User A and the target objects belonging, e.g., to the same Configurable Target Object Class 611 will be general enough to fit the category. For example, Wireless Personal Mobile Devices 621 (e.g. tablets), and Smart-Phones 622 are two examples of Sub Classes 620 among the broad Wireless Handheld Devices 611 class. These two subclasses may only have a limited number of shared attributes in common so that those shared attributes can be reused across the broad configurable target objects class of Wireless Handheld Devices 611.

As a matter of illustration, if User A pairs first with a tablet belonging to the Wireless Personal Mobile Devices 621 sub class and then pairs with a smartphone belonging to the Smart-phones 622 sub class then browser's bookmarks can be shared and reused across these subclasses. Browser Bookmarks are an example of attributes that may belong to the broadest class of configurable target objects Wireless Handheld Devices 611 to which both a Tablet and a Smartphone may belong. Only attributes that belong to the broadest class can be reused and can be shared across target objects that belong to narrower subclasses under the broad umbrella of the Wireless Handheld Devices 611 class.

The person skilled in the art will understand that, in one implementation, the higher the similarity between objects (in hardware and software), the more probable it is that these objects will belong not only to the same class but also to the same subclass or sub-subclass. In one implementation, Target Objects 160 can be identified via a Target Object-ID wherein, for example, the first block of eight digits of the ID will identify the broad class of Configurable Target Object Class, the second block of eight digits the Sub Class, the third block of eight digits the sub-sub class and so on until the last block of digits will identify the specific Target Object 160. Said classification system may allow the adaptable configuration of target objects on a best effort basis according to a hierarchical system. Switching between objects with identical hardware and software belonging to the same sub-sub class may produce the highest customization of the shared attributes. Switching between objects with dissimilar hardware or software may produce a smaller degree of customization because the possible shared attributes are less. In one implementation, a codification system may employ many sub-classes and not only two as described in FIG. 6.

With reference to FIG. 6, examples of broad Configurable Target Objects Classes 610 are Wireless Handheld Devices 611, Vehicles 612, Smart Weapons 613, Wearable Devices 614. Within Wireless Handheld Devices 611 class the Sub Classes 620 of Wireless Personal Mobile Devices 621 and Smart-Phones 622 may differentiate those devices that are tied to a carrier such as AT&T or T-Mobile from those devices that rely on an open connectivity or personal connectivity such as the home Wi-Fi system.

In another example, wherein the attributes can be common to the general broad class of Configurable Target Objects Class of Wireless Handheld Devices 611, login and passwords for common applications such as, e.g. Facebook, Skype, LinkedIn and the like, can be imported and applied across the broad class of devices seamlessly if they are stored, e.g., on Server 100.

Column Personalizations 640 contains all the preferences that User A has chosen and that can be translated across multiple target devices. Certain personalization attributes can be peculiar only of a certain Sub Class, others can be common across the broad Configurable Target Object Class. For example, Filed 642 may contain Personalizations that apply to Wireless Personal Mobile Devices 621 while Filed 641 may contain Personalizations that apply to Smart Phones 622.

Column Settings 650 contains data for those attributes fields that can be controlled and modified via I/O User Interface 450 or via Computer 112 and Computer 113 by both User A and Authority B. User A may override default settings that Authority B recommends. Field 651 and Field 652 may contain, e.g., settings wherein a Wi-Fi connection is established using different parameters or WEP keys.

Column Permissions 660 contains those authorizations and permissions that can be controlled by at least one authority. For example, a smart phone could be in the care of an employee of a company but could belong and be paid for by said company. Said company may impose certain limitations to the usage of the smart phone. As described in Field 661, Authority B may pose temporal limitations, spatial limitations, credit limitations or user IDs restrictions limitations. For example, only employees belonging to the same company could be allowed to pair with said smart-phone.

In certain implementations, if electronic equipment is leased, temporal limitations may be contained, for example, in Field 665 so that equipment may become inoperable unless User A is current with payments.

Configurable target Object Class Vehicles 612 has been discussed in part with reference to FIG. 2. One possible example of subclasses could be Personal Car 623 and Rented Car 624 subclasses. The person skilled in the art will understand that many different personal, public or shared transportation vehicles either moving via air, ground or sea may form a class or sub-class of their own. As discussed distributed servers may provide data related to User A and Target Object 160 with which he is currently paired.

For example, in the case of a sporty and powerful personal car that can be driven by both a teenager and his father, the car may adjust according to who is driving the car and apply safety measures when the teenager is driving it. Examples of safety measures can be speed and acceleration limitations, power limitations, functioning range limitations, warnings and notifications.

In another implementation, when the car is a rented car, User A's company may also pose certain restrictions to the usage of the car in order to maximize company's return on investment, safeguard its employee safety, or limit the costs associated with the business trip as described in Field 654.

In certain implementations, more than one authority can bestow certain limitations or grant certain permissions to Target Object 160 and User A. In the case of a rented vehicle, Rental Car Company owning the vehicle could be Authority B, User A's company could be Authority C (if, e.g., the car is rented for a business trip via company's credit card), and a Law Enforcement Agency storing all the driving records pertaining to User A could be Authority D. In certain scenarios, there could be a hierarchy among authorities and a certain authority may override another authority for permissions or limitations. For example, in the case of a rented car, User's A Company could be at the bottom of the hierarchy, Rental Car Company could be at a middle level and a Law Enforcement agency could be at the top level.

In one implementation, the configurable target object class is Smart Weapons 613. It is conceivable that future weapons, e.g. an automatic rifle M16, may embed more and more electronics and modules, such as the ones described in FIG. 4. Smart weapons could be connected to a telecommunications network system, be aware of their location, be able to communicate with other surrounding smart weapons and be able to trigger alerts. For example, if a smart weapon that is part of an ad hoc network of other smart weapons fires shots, the system may trigger alerts and indications to the ad-hoc network of smart weapons. In one implementation, if a laser guided system is in place that can determine a distance parameter, the smart weapon that is firing could send indications of where the target (that is being shot) is located, e.g., to the optical aiming mechanisms of surrounding friendly smart weapons.

In one embodiment, certain weapons may belong to sub class Law Enforcement 625 and be issued only to law enforcement agents. Other weapons may belong to sub class Private Citizens and be issued only to private citizens. In one implementation, a personalization may consist, e.g., of electronic adjustments of the aiming optic as described in Field 645. In another implementation, a smart weapon Target Object 160 may only be functioning if the User ID that is paired with it has the necessary authorizations that are contained in column Permissions 660. Said authorizations, both related to a user or a weapon could be revoked remotely from different authorities. For example, a law enforcement agency could revoke the authorization. A psychiatric hospital could revoke or suspend the authorization. An agency in charge of administering periodic weapon related trainings to licensed users could revoke the authorization. Schools may also revoke or suspend the authorizations to smart weapons belonging to sub class Private Citizens 626 if they are located in areas nearby their premises during school activities.

The person skilled in the art will understand that for the security and safety measures described herein to work certain tamper proof technologies and functionalities should be implemented. For example, certain electric modules, such as the ones described in FIG. 4, may be enclosed within sealed containers that, if opened, may render the whole weapon inoperable. For example, an anti tamper module could release acid liquid that may irremediably damage core functional elements of a gun such the gas piston module or the barrel or other. In some implementations, certain authorities could permanently disable a particular Target Object 160 belonging to the Smart Weapons 613 class. A Law Enforcement Agency, e.g., could render weapons that have been reported stolen inoperable remotely by triggering the functionalities of said disabling module. In other implementations, said disabling module could be triggered by geolocation restrictions that are imposed, for example, in coincidence with certain events that need extra security within a certain area. In certain implementations, the disabling of the smart weapon could be only temporary rather than permanent. This can be achieved via electronic modules that could temporarily inhibit the functionality of the smart weapon.

Field 662 may provide certain security features for the benefit of law enforcement agents. For example, certain smart weapons may work only within or outside certain geographic boundaries. In other implementations, they may work only in proximity of a reference point (such as police car). If a smart weapon is stolen and transported away from the police car it may become inoperative. Field 662 provides also the opportunity to discuss a general concept of the invention pertaining to users' permissions; target objects' functionalities, and geo-location. In one embodiment of the invention, some or all of the functionalities of Target Object 160 may be enabled only if a user, such as User A, is paired with it. For example, a weapon may not be functioning unless a predetermined user is paired. The authorization and authentication algorithm may run on the smart weapon or on the cloud. In addition, with regard to geolocation, a Target Object 160 may not be functioning if located within a predetermined threshold distance from another target object or User B.

This may be useful in situations where public service agents are present at the scene. A smart weapon may become inactive when Police Agents or other target objects having a priority status are within a certain threshold distance. On the other hand, in another implementation, certain functions of Target Object 160 could be accessible only if said Target Object 160 is located within a predetermined threshold distance from another different target object or User B. For example soldiers in a platoon that is supposed to move together may have functionalities that are enabled only if smart weapons move together.

In one possible implementation, the target objects (or the users associated with said target objects) may belong to a hierarchical classification system wherein, when the mutual presence within a certain threshold distance occurs, said hierarchical classification may result in the enabling, disabling, or regulating of at least some of the functionalities of at least one of said target object. The person skilled in the art will understand that this is a general concept that is not limited to weapons. A hierarchical classification system can be applicable across the whole spectrum of possible target objects wherein functionalities of objects that are co-located within a certain area or within a certain threshold distance can be regulated according to said hierarchy.

In another implementation, the dynamic creation of a geofence in a certain location may result in the enabling, the disabling or the regulating of certain functionalities for target objects (or users associated with said target objects) that are located within said geofence. For example, certain smart weapons may stop working temporarily or permanently within the geofence. If, e.g., a robbery is underway in a bank, an automatic or manual alarm system may trigger said geofence. The concept is general and can be applied across the whole spectrum of target objects classes. Certain target objects, such as smart phones, may start working or exhibit certain functionalities if located within the dynamically created geofence.

U.S. Pat. No. 6,549,768, having the same inventor as the present application, provides indicia on how to implement a system based on the enabling or disabling of functionalities of target objects that is based on a distance threshold between users or target objects associated with those users.

Field 655 describes an exemplary functionality/setting that would trigger an alert to a nearby police station if a shot were fired. Said functionality may also be part of the Permission 660 column for Private Citizens 626 smart weapons and could be a mandatory function for Private Citizens 626 smart weapons. In one implementation, notifications to law enforcement agencies may not issue if shots are fired within a certain area that is marked as a weapons training facility. The person skilled in the art will understand that this is a general concept that is not limited to weapons. Alerts or notifications may issue according to different conditions that can be applicable across the whole spectrum of possible target objects.

Field 663 may contain data related to certain permissions and limitations that could be imposed by authorities upon weapons owned by private citizens for the defense of their homestead. In certain implementations, weapons may be allowed to be functional only within a certain area centered on User A's homestead or only within a certain time window.

In certain implementations, the status of the smart weapon can be notified to User A. For example, a green light may signal a functional status of the smart weapon while a red light may signal an inhibited status of the weapon. This concept can be implemented also for other classes of target objects.

Wearable Devices 614 is another example of Configurable Target Object Class. One possible sub class that has been discussed with reference to FIG. 3 is Augmented Reality Glasses 627. Filed 646 may contain certain User A's Personalizations related to augmented reality. For example, Augmented Reality Glasses 627 may augment User A's contacts (people that User A knows) or relevant events or relevant objects if within a certain distance from User A.

U.S. Pat. No. 6,549,768, having the same inventor as the present patent application also provides indicia on how to implement a system based on the regulating of functionalities of target objects that is based on a distance threshold between users (or target objects associated with those users) wherein datagrams store users' profiles. The patent is based on the knowledge of the location of the participating users by the system. With the development of locationing technology, even indoor (based on WiFi readings or RF-ID readings) the concepts described in the patent can be reused in the contest of augmented reality wherein the augmentation will be based on the knowledge of the position of the equipment, its orientation (pitch, roll, yaw), the knowledge of the position of the equipment to be augmented (e.g., another user wearing augmented reality equipment) and the information associated with it. For example, the wearer of augmented reality equipment may experience the augmentation of female single individuals having certain characteristics (provided he has the necessary permissions). The same concept can be used for businesses purposes using for example LinkedIn profiles. Certain categories of users could be augmented, for example, users who belong to a certain LinkedIn group.

In an alternative implementation that is based instead on RF-ID technology, Target Object 160, reality augmented glasses, may interrogate via RF-ID Reader 485 surrounding users who are, e.g., also wearing similar augmented reality glasses. The interrogation may trigger the response via an RF-ID Tag 440 in the pair of glasses of the user who is within Visual Field 300. If the receiving or interrogating antenna in RF-ID Reader 485 is directional enough, augmented reality glasses may receive only those responses from users who are within Visual Field 300. In one implementation, Target Object 160 may send to Server 100 the RF-ID response received, associate it with a profile of the user within Visual Field 300 and retrieve the information associated with said user. Augmented reality equipment (Target Object 160) may paint within Visual Field 300 information related to said user according to the privacy and permission policy applied. For example, one of the conditions for being able to retrieve user information via the systems described could be reciprocity. Only users who allow their status or information to be augmented may be able to receive surrounding users' status or information. In certain implementations, augmentation permissions may be regulated according to membership to groups. For example, members of the same LinkedIn group could be able to augment other members. Member of the same dating system, such as Match.Com, could be able to augment each other.

In another implementation, Filed 656 may contain settings that may prevent accidents when User A is, e.g., driving while wearing said augmented reality glasses. The augmentation function can be paused when a cinematic vector above a certain threshold is detected by the system.

In another implementation, Field 664 may contain data concerning permissions to receive augmented information related to a touristic package for a city that User A is visiting. Examples have been discussed with reference to FIG. 3. FIG. 7 represents an exemplary method embodiment for adapting a configurable and connected target object in accordance with a datagram that is associated with a user wherein said method is implemented via computer program software that is stored and is running on at least one server. The method comprises the following steps: 1) receiving a User ID and a Target Object-ID from a connected Target Object 160; 2) retrieving from at least one datagram associated with said User ID at least one adaptable attribute data pertaining to said target object that is stored in said at least one datagram; and 3) sending indicia of said at least one adaptable attribute data to said Target Object 160 to adapt it according to data associated with said User ID.

Embodiments of the present invention can be implemented in software, hardware, application logic or a combination of software, hardware and application logic. The software, application logic and/or hardware may reside on mobile computer equipment, fixed equipment or servers that may not always be owned or operated by a single entity. If desired, part of the software, application logic and/or hardware may reside on multiple servers and equipment in charge of different processes.

In an example embodiment, the application logic, software or an instruction set is maintained on any one of various conventional computer-readable media. In the context of this application, a "computer-readable medium" may be any media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a fixed or mobile computer.

If desired, the different functions discussed herein may be performed in a different order and/or concurrently with each other. Furthermore, if desired, one or more of the above-described functions may be optional or can be combined. As technology advances, new equipment and techniques could be viable substitutes of the equipment and techniques that have been described in this application. RF-ID technology is one of the possible technologies that can be used to expediently implement this invention. The person skilled in the art will understand that other technologies that may allow the association of a connected object with a User ID can be appropriate substitutes.

Although various aspects of the invention are set out in the independent claims, other aspects of the invention comprise other combinations of features from the described embodiments and/or the dependent claims with the features of the independent claims, and not solely the combinations explicitly set out in the claims. The above described example embodiments of the invention should not be viewed as limiting but merely as explanatory. There are several variations and modifications, which may be made without departing from the scope of the present invention as, defined in the appended claims. "Plurality" shall mean one or more.

The invention claimed is:

1. Method comprising:
   facilitating receiving both a User ID, associated with a master object, and a Target Object ID, associated with a target object, from a target object having wireless connectivity capability and the capability of adjusting at least one adaptable attribute out of a plurality of adaptable attributes, wherein:
   a) said target object facilitates its association with said User ID by means of at least a physical contact between said target object and an end user that is associated with both said User ID and said master object;
   b) said target object maintains at least one functionality derived from said association with said User ID based, at least in part, on at least one criterion selected from the group consisting of: detected proximity between said target object and said end user, detected proximity between said user and said master object, detected proximity between said target object and said master object, a response to a periodic RF-ID interrogation that is regulated by a touch sensor, a response to an RF-ID interrogation that is regulated by an accelerometer, a physical contact between said target object and said end user as determined by a sensor, presence of said target object within a predetermined area, a threshold distance between said target object and at least another predetermined target object, a hierarchical arrangement including at least said target object and at least another target object, a hierarchical arrangement including at least said target object and at least one authority having control, at least in part, over said target object, a hierarchical arrangement including at least said target object and at least another master object, and combinations thereof;
   c) said target object is adapted to be shared among a plurality of users by configuring said plurality of adaptable attributes;
   d) said target object is portable by said end user;
   e) said target object is augmented reality equipment, whereby an augmentation functionality is executed according to data in a profile pertaining to said user that is contained in at least one datagram;

f) said plurality of adaptable attributes includes at least a personalization attribute that will adapt said target object to one or more preferences of said end user;

facilitating wirelessly retrieving from said at least one datagram, which is associated with said User ID, adaptable attribute data pertaining to said user that are stored in said at least one datagram; and facilitating adapting said at least one adaptable attribute out of said plurality of adaptable attributes of said target object according to said adaptable attribute data.

2. The method of claim 1, wherein said target object is collecting visual indicia analytics associated with said user pertaining to objects and people within the field of view of said augmented reality equipment by means of a video camera, when said augmented reality equipment is associated with said User ID, wherein said visual indicia analytics are used to supplement said profile pertaining to said user.

3. The method of claim 1, wherein said target object is adapted to collect analytics pertaining to trademarks in the field of view of said augmented reality equipment.

4. The method of claim 1, wherein said target object is adapted to receive information pertaining to objects the field of view of said augmented reality equipment, when said objects are maintained within said field of view for at least a predetermined period.

5. The method of claim 1, wherein said master object is a wrist-wearable item.

6. The method of claim 1, wherein said augmentation functionality generates advertisement according to said profile pertaining to said user.

7. The method of claim 1, wherein said target object is adapted to relate, by means of a wireless signal, to objects within its field of view, when said objects are maintained within said field of view for at least a predetermined period.

8. At least one non-transitory computer-readable medium for controlling at least one general-purpose digital computer in performing desired functions comprising:

a set of instructions formed into each of a plurality of modules, each modules comprising:

a process for facilitating receiving both a User ID associated with a master object and a Target Object ID associated with a target object from a target object having wireless connectivity capability and the capability of adjusting at least one adaptable attribute out of a plurality of adaptable attributes, wherein:

a) said target object facilitates its association with said User ID by means of at least a physical contact between said target object and an end user that is associated with both said User ID and said master object; and b) said target object maintains at least one functionality derived from said association with said User ID based, at least in part, on at least one criterion selected from the group consisting of: detected proximity between said target object and said end user, detected proximity between said user and said master object, detected proximity between said target object and said master object, a response to an RF-ID interrogation that is regulated by a touch sensor, a response to a periodic RF-ID interrogation that is regulated by an accelerometer, a physical contact between said target object and said end user as determined by a touch sensor, presence of said target object within a predetermined area, a threshold distance between said target object and at least another predetermined target object, a hierarchical arrangement including at least said target object and at least another predetermined target object, a hierarchical arrangement including at least said target object and at least one authority having control, at least in part, over said target object, a hierarchical arrangement including at least said target object and at least another master object, and combinations thereof;

c) said target object is adapted to be shared among a plurality of users by configuring said plurality of adaptable attributes;

d) said target object is portable by said end user;

e) said target object is augmented reality equipment, whereby an augmentation functionality is executed according to data in a profile pertaining to said user that is contained in at least one datagram;

f) said plurality of adaptable attributes includes at least a personalization attribute that will adapt said target object to one or more preferences of said end user;

a process for facilitating wirelessly retrieving from said at least one datagram, which is associated with said User ID, adaptable attribute data pertaining to said user that are stored in said at least one datagram; and a process for facilitating adapting said at least one adaptable attribute out of said plurality of adaptable attributes of said target object according to said adaptable attribute data.

9. The non-transitory computer-readable medium of claim 8, wherein said augmented reality equipment collects visual indicia analytics pertaining to objects and people in the field of view of said augmented reality equipment that is associated with said User ID by means of a video camera, wherein said visual indicia analytics are used to supplement said profile pertaining to said user.

10. The non-transitory computer-readable medium of claim 8, wherein said augmentation functionality generates advertisement according to said profile pertaining to said user.

11. The non-transitory computer-readable medium of claim 8, wherein said master object is a wrist-wearable item.

12. The non-transitory computer-readable medium of claim 8, wherein said target object is adapted to relate, by means of a wireless signal, to objects within its field of view, when said objects are maintained within said field of view for at least a predetermined period.

13. The non-transitory computer-readable medium of claim 8, wherein at least one input-output functionality related to said target object is controlled by the placing of at least one finger in the field of view of said augmented reality equipment.

14. The non-transitory computer-readable medium of claim 8, wherein said augmented reality equipment is contained in a vehicle and displays augmentation indicia in said vehicle.

15. An apparatus, comprising:

at least one processor; and at least one non-transitory computer-readable medium including a computer program code; the at least one non-transitory computer-readable medium and the computer program code configured to, with the at least one processor, cause the apparatus to perform at least the following:

facilitating receiving both a User ID, associated with a master object, and a Target Object ID, associated with a target object, from a target object having wireless connectivity capability and the capability of adjusting at least one adaptable attribute out of a plurality of adaptable attributes, wherein:

a) said target object facilitates its association with said User ID by means of at least a physical contact between said target object and an end user that is associated with both said User ID and said master object; and b) said target object maintains at least one functionality derived from said association with said User ID based, at least in part, on at least one criterion selected from the group consisting of: detected proximity between said target object and said end user, detected proximity between said user and said master object, detected proximity between said target object and said master object, a response to a periodic RF-ID interrogation that is regulated by a touch sensor, a response to an RF-ID interrogation that is regulated by an accelerometer, a physical contact between said target object and said end user as determined by a touch sensor, presence of said target object within a predetermined area, a threshold distance between said target object and at least another predetermined target object, a hierarchical arrangement including at least said target object and at least another predetermined target object, a hierarchical arrangement including at least said target object and at least one authority having control, at least in part, over said target object, a hierarchical arrangement including at least said target object and at least another master object, and combinations thereof;
c) said target object is adapted to be shared among a plurality of users by configuring said plurality of adaptable attributes;
d) said target object is portable by said end user;
e) said target object is smart weapon incorporating a module for facilitating its remote disabling;
f) said plurality of adaptable attributes includes at least a permission attribute that will adapt said target object to one or more permissions related to said end user;
facilitating wirelessly retrieving from at least one datagram, which is associated with said User ID, adaptable attribute data pertaining to said user that are stored in said at least one datagram; and
facilitating adapting said at least one adaptable attribute out of said plurality of adaptable attributes of said target object according to said adaptable attribute data.

16. The apparatus of claim 15, wherein said master object is a wrist-wearable item.

17. The apparatus of claim 15, wherein said smart weapon ceases functioning according to an algorithm having as an input at least a datum selected from the group consisting of: a location of another smart weapon having higher priority, a permanent location set by an authority via a computer system, a temporary location set by an authority via a computer system, a location of a vehicle owned by an authority, a location set by an owner of record of said smart weapon, a location associated with an automatic system detecting the occurrence of one or more predetermined conditions, and combinations thereof.

18. The apparatus of claim 15, wherein said smart weapon functions according to an algorithm having as an input at least a datum selected from the group consisting of: a location of another smart weapon having lower priority, a permanent location set by an authority via a computer system, a temporary location set by an authority via a computer system, a location of a vehicle owned by an authority, a location set by an owner of record of said smart weapon, a location associated with an automatic system detecting the occurrence of one or more predetermined conditions, and combinations thereof.

19. The apparatus of claim 15, wherein said smart weapon facilitates the sending of an alert to an authority when a predetermined threshold condition is met.

20. The apparatus of claim 15, wherein said smart weapon contains means for remotely disabling at least one of its functionalities.

* * * * *